US011444769B2

(12) United States Patent
Wentz

(10) Patent No.: US 11,444,769 B2
(45) Date of Patent: Sep. 13, 2022

(54) SYSTEMS, DEVICES, AND METHODS FOR SIGNAL LOCALIZATION AND VERIFICATION OF SENSOR DATA

(71) Applicant: Ares Technologies, Inc., Cambridge, MA (US)

(72) Inventor: Christian Wentz, Providence, RI (US)

(73) Assignee: Ares Technologies, Inc., Cambridge, MA (US)

( * ) Notice: Subject to any disclaimer, the term of this patent is extended or adjusted under 35 U.S.C. 154(b) by 542 days.

(21) Appl. No.: 16/460,724

(22) Filed: Jul. 2, 2019

(65) Prior Publication Data

US 2020/0007331 A1 Jan. 2, 2020

Related U.S. Application Data

(60) Provisional application No. 62/693,048, filed on Jul. 2, 2018.

(51) Int. Cl.
*H04L 9/32* (2006.01)
*G06F 1/12* (2006.01)
*H04L 67/12* (2022.01)
*G01S 19/21* (2010.01)

(52) U.S. Cl.
CPC .......... *H04L 9/321* (2013.01); *G06F 1/12* (2013.01); *H04L 9/3236* (2013.01); *H04L 9/3247* (2013.01); *H04L 9/3297* (2013.01); *G01S 19/215* (2013.01); *H04L 67/12* (2013.01); *H04L 2209/38* (2013.01)

(58) Field of Classification Search
CPC ..... H04L 9/321; H04L 9/3236; H04L 9/3247; H04L 9/3297; H04L 67/12; H04L 2209/38; H04L 9/006; H04L 9/3218; H04L 9/3263; H04L 9/3278; H04L 69/28; G06F 1/12; G06F 1/14; G01S 19/215; G01S 19/14

See application file for complete search history.

(56) References Cited

U.S. PATENT DOCUMENTS

| | | | | |
|---|---|---|---|---|
| 7,340,610 B1* | 3/2008 | Yagawa | ............... | H04L 9/3236 |
| | | | | 711/133 |
| 2009/0323937 A1* | 12/2009 | Teng | .................... | H04L 9/0891 |
| | | | | 380/36 |
| 2017/0150368 A1* | 5/2017 | Ngo | ......................... | G01S 5/02 |

FOREIGN PATENT DOCUMENTS

| | | | | |
|---|---|---|---|---|
| CN | 108632293 B | * | 8/2021 | ........... H04L 9/3247 |
| WO | WO-2018214834 A1 | * | 11/2018 | ........... H04L 9/0861 |
| WO | WO-2019145922 A1 | * | 8/2019 | ............. H04W 4/20 |

OTHER PUBLICATIONS

Internet of Things Authentication: A Blockchain solution using SRAM Physical Unclonable Functions, Guardtime, 2016, pp. 1-16.
Maria Korolov, What is GPS spoofing? And how can you defend against it, IDG Communications, Inc., 2020, https://www.csoonline.com/article/3393462/what-is-gps-spoofing-and-how-you-can-defend-against-it.html.

* cited by examiner

*Primary Examiner* — Mohammed Waliullah
(74) *Attorney, Agent, or Firm* — Caldwell Intellectual Property Law

(57) ABSTRACT

A method of authenticating sensor data includes receiving, by at least a temporal attester, sensor data, calculating, by the at least a temporal attester, a current time, generating, by the at least a temporal attester, a secure timestamp generated as a function of the current time, and transmitting, by the at least a temporal attester and to at least a verifier, a temporally attested sensor signal including the secure timestamp.

20 Claims, 5 Drawing Sheets

```
                                                            ┌─ 400
┌──────────────────────────────────────────────────────┐
│  Receiving a Temporally Attested Sensor Signal, Wherein │
│  the Temporally Attested Sensor Signal Further Includes at │
│   Least a Secure Timestamp and at Least a Sensor Datum │
│                         405                          │
└──────────────────────────────────────────────────────┘
                             │
                             ▼
┌──────────────────────────────────────────────────────┐
│  Verifying, by the at Least a Temporal Verifier, the at Least │
│                  a Secure Timestamp                  │
│                         410                          │
└──────────────────────────────────────────────────────┘
                             │
                             ▼
┌──────────────────────────────────────────────────────┐
│   Determining, as a Function of the at Least a Secure │
│  Timestamp, an Authenticity of the Temporally Attested │
│                     Sensor Signal                    │
│                         415                          │
└──────────────────────────────────────────────────────┘
```

*FIG. 4*

SYSTEMS, DEVICES, AND METHODS FOR SIGNAL LOCALIZATION AND VERIFICATION OF SENSOR DATA

FIELD OF THE INVENTION

The present invention generally relates to the field of signal processing and analysis. In particular, the present invention is directed to systems, devices, and methods for signal localization and verification of sensor data.

BACKGROUND

As electronic communication becomes an increasingly indispensable element of computing, efficiency and reliability of signal acquisition, processing, and efficient inter-device communication is signal localization and verification. For instance, one of the most common technologies used to establish geospatial location is the global positioning system (GPS) managed by the United States Air Force. In this system, a constellation of satellites in geosynchronous orbit (that is, each being relatively fixed location above the earth) emits a unique radiofrequency beacon. An object on the earth may use one or more radiofrequency beacons to determine partial or complete location in 3-dimensional space (3-space). Various correction factors, including time coding of the radiofrequency beacon and ground-based correction codes (e.g. those used in differential GPS) may be used to improve fidelity of location in 3-space. This approach in its most general form amounts to inference of the listener's location by its detection of beacon signals whose origins are known, as well as the time delay between signal being transmitted by the beacon signal and received by listener. This protocol unfortunately gives rise to significant security concerns around authentication. Specifically, given that these beacon signals may be detectable by other parties, it is possible for a malicious actor to fabricate location information by knowing the locations of beacons and the encoding protocols of the beacons, potentially misrepresenting the location of an innocent actor, threatening the integrity of the system, and resulting in inconvenience and economic costs at best, and safety problems at worst.

SUMMARY OF THE DISCLOSURE

In an aspect, a system for signal localization and verification of sensor data includes a temporal attestor, the temporal attestor configured to receive, sensor data, calculate a current time, generate a secure timestamp generated as a function of the current time transmit, to at least a verifier, a temporally attested sensor signal including the secure timestamp.

In another aspect, method of signal localization and verification of sensor data includes receiving, by at least a temporal attester sensor data. The method includes calculating, by the at least a temporal attester, a current time. The method includes generating, by the at least a temporal attester, a secure timestamp generated as a function of the current time. The method includes transmitting, by the at least a temporal attester and to at least a verifier, a temporally attested sensor signal including the secure timestamp.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 4 illustrates particular implementations of various steps of a method of authenticating sensor data.

Figure 1:
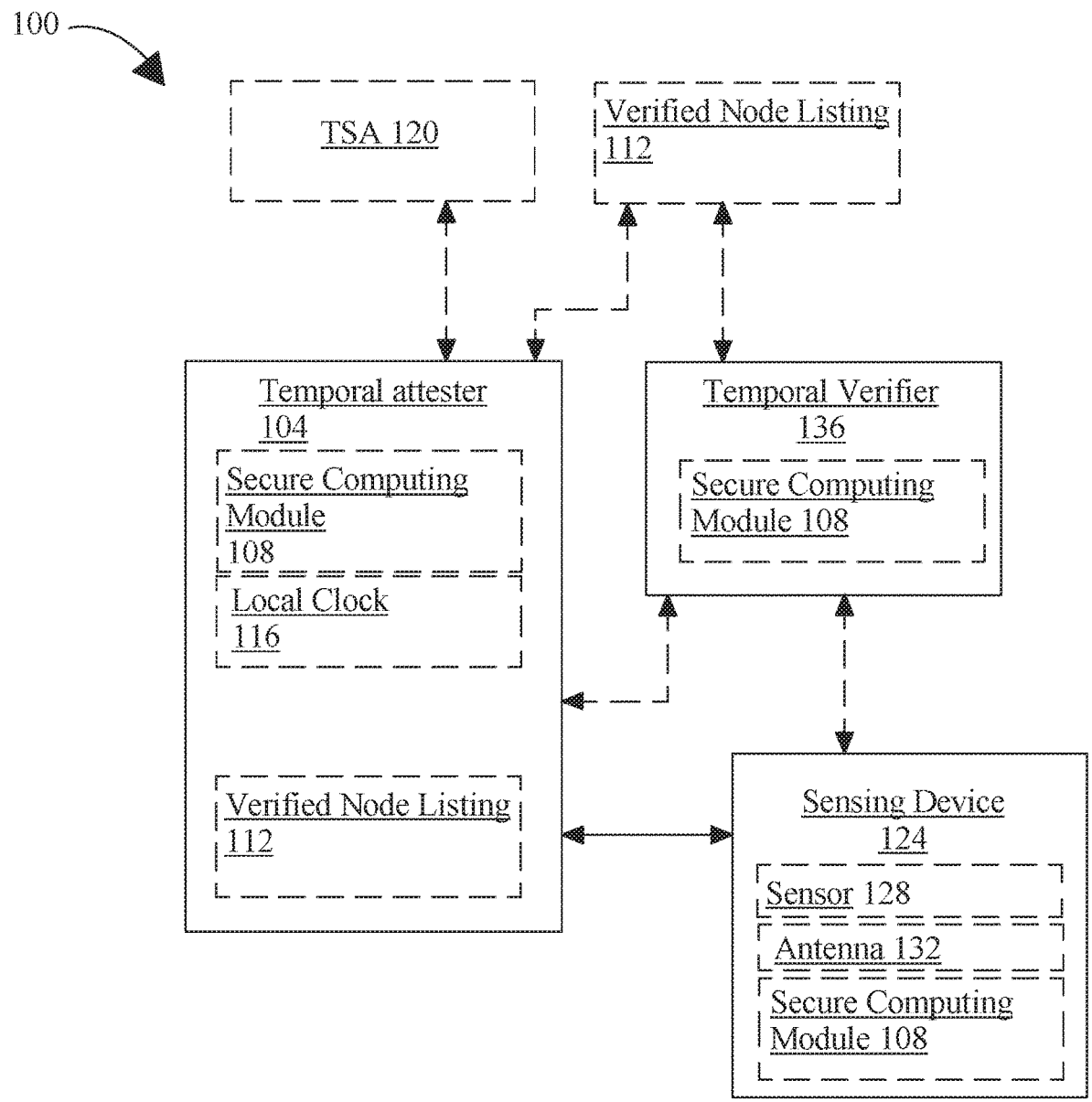
FIG. 1 is a block diagram illustrating a system for authenticating sensor data.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Embodiments of the disclosed systems, devices, and methods enable rapid and accurate authentication of data a device such as a sensor or listener claims to have received, using attested time. In an embodiment, secure timestamps generated using attested time protocols may be linked to data signals, such as sensor or beacon data. This in turn may be used to determine whether the circumstances under which the data were detected or received are accurate, to effectively localize sensors and/or devices intercommunicating therewith, or the like. Applications may include accurate generation of location data for additional devices, efficient routing of distributed computation or other communication-dependent processes, detection of fraudulent sensor or beacon data or fraudulent communications thereof, ensuring that decisions or conclusions arrived at based on the data are accurate.

Systems and methods as described herein may involve computation, calculation, assessment, assignment, or use of a confidence level associated with one or more processes, devices, or data, including without limitation one or more processes, appraisals, and/or cryptographic evaluators as described herein. Confidence level, as used herein, is an element of data expressing a degree to which the safety, security, or authenticity of a process, device, or datum may be relied upon. As used herein, a confidence level may include a numerical score; numerical score may be a score on a scale having one extremum representing a maximal degree of reliability, and a second extremum representing a minimum degree of reliability. As a non-limiting example, extremum representing maximal degree of reliability may be a maximal number of an ordered set of numbers such as an open or closed set on the real number line, a sequential listing of integers or natural numbers, or the like; persons skilled in the art will be aware that selection of a numerical extremum to represent a higher level of confidence or reliability, albeit intuitively pleasing, is not mathematically necessary, and any suitable mapping of level of confidence or reliability to numerical objects or ranges may feasibly be substituted. As a further non-limiting example, numerical score may include, or be mappable to, a probability score, such as a percentage probability or a 0-1 probability level. Confidence level may include further information or indications, such as without limitation flags denoting untrustworthy, suspect, or hostile elements; for instance a flag may indicate that a particular device, program, process, or element of data appears to be compromised and/or has been involved in fraudulent or otherwise hostile or disruptive engagement with system 100 and/or methods described herein in the past. Methods of aggregating, computing, and/or using confidence levels will be described in further detail below. Persons skilled in the art, upon reviewing the entirety of this disclosure, will be aware of various ways in which confidence levels may be implemented, calculated, assigned, and/or used as consistent with methods and systems disclosed herein.

In some embodiments, systems and methods described herein produce cryptographic hashes, also referred to by the equivalent shorthand term "hashes." A cryptographic hash, as used herein, is a mathematical representation of a lot of data, such as a file, a communication packet or set thereof, or block in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is lossy, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1405-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $325^6$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

In an embodiment, methods and systems described herein may perform implement one or more aspects of a cryptographic system. In one embodiment, a cryptographic system is a system that converts data from a first form, known as "plaintext," which is intelligible when viewed in its intended format, into a second form, known as "cyphertext," which is not intelligible when viewed in the same way. Cyphertext may be unintelligible in any format unless first converted back to plaintext. In one embodiment, a process of converting plaintext into cyphertext is known as "encryption." Encryption process may involve the use of a datum, known as an "encryption key," to alter plaintext. Cryptographic system may also convert cyphertext back into plaintext, which is a process known as "decryption." Decryption process may involve the use of a datum, known as a "decryption key," to return the cyphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the cyphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

Turning now to FIG. 1, an exemplary embodiment of a system 100 for authenticating sensor data is illustrated. System 100 may include at least a temporal attester 104. At least a temporal attester 104, as used herein, is a device that can generate and provide secure timestamps as described in further detail below. At least a temporal attester 104 may include a processor. Processor may include any processor as described in this disclosure, or any combination of such processors performing coordinated tasks using multithreading, sequential performance of dedicated tasks, or the like. In an embodiment, processor is configured to receive sensor data, calculate a current time as a function of the temporal output, generate a secure timestamp as a function of the current time, transmit to at least a verifier a temporally attested sensor signal including the secure timestamp, for instance by performing methods as described in further detail below.

At least a temporal attester 104 may include any computing device as described in this disclosure, including without limitation a microcontroller, microprocessor, digital signal processor (DSP) and/or system on a chip (SoC) as described in this disclosure. At least a temporal attester 104 may be housed with, may be incorporated in, or may incorporate one or more sensors of at least a sensor. Computing device may include, be included in, and/or communicate with a mobile device such as a mobile telephone or smartphone. At least a temporal attester 104 may include a single computing device operating independently, or may include two or more computing device operating in concert, in parallel, sequentially or the like; two or more computing devices may be included together in a single computing device or in two or more computing devices. At least a temporal attester 104 with one or more additional devices as described below in further detail via a network interface device. Network interface device may be utilized for connecting a at least a temporal attester 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. At least a temporal attester 104 may include but is not limited to, for example, a at least a temporal attester 104 or cluster of computing devices in a first location and a second computing device or cluster of computing devices in a second location. At least a temporal attester 104 may include one or more computing devices dedicated to data storage, security, distribution of traffic for load balancing, and the like. At least a temporal attester 104 may distribute one or more computing tasks as described below across a plurality of computing devices of computing device, which may operate in parallel, in series, redundantly, or in any other manner used for distribution of tasks or memory between computing devices. At least a temporal attester 104 may be implemented using a "shared nothing" architecture in which data is cached at the worker, in an embodiment, this may enable scalability of system 100 and/or computing device.

Still referring to FIG. 1, at least a temporal attester 104 and/or one or more modules operating thereon may be designed and/or configured to perform any method, method step, or sequence of method steps in any embodiment described in this disclosure, in any order and with any degree of repetition. For instance, at least a temporal attester 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. At least a temporal attester 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, any temporal attester 104 may include a secure computing module 108. As used herein, a secure computing module 108 is a hardware element configured to perform one or more secured operations beyond the control of other circuit elements or software, whether incorporated with the secure computing module 108 in a circuit or computing device, or a part of an extrinsic computing device. As a result, at least one secured operation performed by secure computing module 108 may be intrinsically reliable; that is, the at least one secured operation may be relied upon by any other module or user to produce an expected result regardless of behavior by neutral or adversarial parties, as long as some basic set of assumptions hold true. Other parties may be able to assign a confidence level in secure computing module 108 and/or a system or computing device incorporating secure computing module 108 based on the above-described set of assumptions. As a non-limiting, example, a secure computing module 108 designed to produce an expected result despite all software-only attacks may give rise to a first confidence level, whereas another secure computing module 108 designed to produce its expected result in the face of all software or hardware attacks may give rise to a second confidence level; the second confidence level may be higher, owing to the reduced probability that the second secure computing module 108 would be compromised.

Still viewing FIG. 1, secure computing module 108 may include a trusted platform module (TPM). In an embodiment, a TPM may include a hardware module, which may be an integrated circuit, an optoelectronic circuit, a section of an integrated circuit on the same die as a processor, an integrated circuit packaged with other die in a multi-chip module or other multi-die integration method, or printed circuit board product; TPM may have any suitable elements of digital or analog circuitry usable to perform one or more processes as described herein, including without limitation processes used to determine confidence levels and/or authenticate digitally signed assertions as described below. TPM may have memory and/or other logic and/or a processor in its own right which may be in a non-limiting example a crypto processor. TPM may have a hard-coded process for signing a digital signature, which may be performed using a private key, which is associated with a public key. This private key and/or signing process may be produced using a genuinely random process during manufacturing, and/or unique object (UNO) fingerprint, and/or a physically unclonable function (PUF), or any other disorder-based security primitive, defined as a function that creates challenge responses from a physical circuit that depend on unique features of that circuit, including without limitation microstructure features or elements that depend on random physical factors occurring or conferred during manufacture. Private key may be extracted via physically unclonable function processes using, for instance, a fuzzy extractor or key extractor physically unclonable function. Private key extraction may utilize additional corrective measures, including as a nonlimiting example machine learning, neural networks, convolutional neural networks and the like, or other approaches to provide error correction over the operating temperature range of the device. Private key generation may additionally incorporate true random number generator(s) (TRNGs), pseudorandom number generators (PRNGs) and related devices.

With continued reference to FIG. 1, secure computing module 108 may include at least PUF. PUF may be implemented by various means. In an embodiment, PUF includes one or more non-intrinsic PUFs. Non-intrinsic PUFs may include without limitation optics based PUFs. Optics-based PUFs may include, as a nonlimiting example, optical PUFs. An optical PUF may be implemented by combining a light source such as lasers with a material that causes unpredictable scattering from the light source; one or more light sensors or light sensor arrays may be used to detect scattered light and output an electrical signal, for instance by generating, at a given light sensor unit, a logic 1 signal for detected light above a given threshold intensity or energy content, and a logic 0 signal for detected light below such threshold. Each light sensor may include any suitable device for converting light to an electrical signal; such devices include, without limitation, avalanche photodiodes (APDs), single photon avalanche diodes (SPADs), silicon photo-multipliers (SiPMs), photo-multiplier tubes (PMTs), micro-channel plates (MCPs), micro-channel plate photomultiplier tubes (MCP-PMTs), photodiodes, and/or photosensitive or photon-detecting circuit elements and/or transducers. Avalanche photo diodes (APDs), as used herein, may include diodes (e.g. without limitation p-n, p-i-n, and others) reverse biased such that a single photon generated carrier can trigger a short, temporary "avalanche" of photocurrent on the order of milliamps or more caused by electrons being accelerated through a high field region of the diode and impact ionizing covalent bonds in the bulk material, these in turn triggering greater impact ionization of electron-hole pairs. When the reverse bias is less than the breakdown voltage, the gain of the APD is approximately linear. For silicon APDs this gain is on the order of 10-100. An APD reverse biased significantly above the breakdown voltage is referred to as a Single Photon Avalanche Diode, or SPAD. In this case the n-p electric field is sufficiently high to sustain an avalanche of current with a single photon, hence referred to as "Geiger mode." This avalanche current rises rapidly (sub-nanosecond), such that detection of the avalanche current can be used to approximate the arrival time of the incident photon. The SPAD may be pulled below breakdown voltage once triggered in order to reset or quench the avalanche current before another photon may be detected, as while the avalanche current is active carriers from additional photons may have a negligible effect on the current in the diode. Persons skilled in the art, upon reviewing the entirety of this disclosure, will be aware of various alternative or additional light detection devices that may be used to detect light scattered by scattering medium.

Still referring to FIG. 1 non-intrinsic PUF may include without limitation a radio frequency (RF)-based PUF. A radio-frequency PUF may be constructed by embedding thin, randomly arranged copper wires in flexible silicone sealant or other RF permissive medium to be exposed to a source of electromagnetic waves, which may, in a non-limiting example, emit in the 5-6 GHz band; near-field scattering of such waves may be detected, for instance, using a matrix of antennas 132 to produce an "RF-DNA PUF" secret near-field scattering of EM waves by the copper wires may be measured, for instance in a 5-6 GHz band; RF-DNA PUFs. Alternatively, an RF-based PUF may be fabricated as an inductor-capacitor (LC) PUF by for instance by incorporating a capacitor, such as a glass plate with metal plates on both sides, serially chained with a passive inductor such as a metal coil on the glass plate; this may form a passive LC resonator circuit which may absorb some amount of power when placed in an external RF field, using for instance an RF emitter as described above. A frequency sweep may indicate the circuit resonant frequencies, which depend on the capacitive and inductive components. Manufacturing variations in the construction may lead to resonant peak variations, the detection of which may generate secret. Persons skilled in the art, upon reviewing the entirety of this disclosure, will be aware of various alternative, additional, or modified methods, means, and/or procedures suitable for use in fabrication of the above described PUFs, or of modification of methods for construction of RF PUFs to be compatible with fabrication of other elements, or with methods of fabrication thereof, as disclosed herein, including without limitation CMOS fabrication.

With continued reference to FIG. 1, non-intrinsic PUF may include one or more electronics based PUFs. Electronics-based PUFs may include, as a nonlimiting example, coating PUFs. In a non-limiting example of a coating PUF, a comb-shaped sensor may be fabricated on the surface of an integrated circuit. A passive dielectric coating may be sprayed directly on the surface, where the dielectric particles are dispersed randomly. Capacitance measurements between sensors may be used as identifiers. Opaque and chemically inert coating may offer further protection. Non-intrinsic PUFs may include power distribution network PUFs. Power distribution network PUFs may be based on resistance variations in a power grid of a silicon chip. Voltage drops and equivalent resistances in power distribution system may be measured and subject to random manufacturing variability. Additional non-intrinsic PUFs may include, without limitation, compact disc (CD)-based PUFs. For instance, measured lengths of lands and pits on a CD may exhibit a random deviation from their intended lengths due to fabrication process variations. This variation may be large enough to be observed by monitoring the electrical signal of the photodetector in a CD player. Non-intrinsic PUFs may include acoustical PUFs, which may be constructed by observing the characteristic frequency spectrum of an acoustical delay line, where a bit string is extracted by performing principal component analysis. Non-intrinsic PUFS may include magstripe-based PUFs, which may leverage randomness of particle patterns in magnetic media (for instance in magnetic swipe cards). These types of PUFs may be used commercially to prevent credit card fraud. In all examples, the bit string may be obtained by a number of mathematical processes, for example independent component analysis (ICA), principal component analysis (PCA), signal power spectral density (PSD) etc.

In an embodiment, and still referring to FIG. 1, PUF may include an "intrinsic PUF" produced via semiconductor construction, including without limitation the fabrication of semiconductor circuit elements based on silicon. As a non-limiting example, a pair of paths may be simulated with identical properties in a design of an integrated circuit; upon fabrication based on simulation, signals may propagate around each path of the pair of paths at a slightly different rate than the other path of the pair of paths. Fabrication may further include fabrication of an "arbiter" component connected to the two paths, the arbiter component configured to generate a first output if a signal arrives first from a first path of the two paths and a second output if a signal arrives first from a second path of the two paths; first output and second output may correspond, as a non-limiting example, to digital values such as logic 1 and logic 0. A plurality of such constructions may be combined to produce a plurality of randomly generated output bits. Other such race-condition PUFs may be similarly constructed. In an embodiment, an intrinsic PUF circuit may be manufactured by fabricating a circuit including two multiplexors, two counters, one comparator, and a plurality of ring oscillators; each oscillator may connect to an input of the two multiplexors, which may be configured to select two ring oscillators to compare, while the counters count the number of oscillations per a time period, and the output is set to 0 if one counter has a higher value and 1 if another counter has a higher value. Multiple such combinations may be used to generate a plurality of bits.

With continued reference to FIG. 1, intrinsic PUFs may include asynchronous PUFs, which may be synonymous with Self-Timed Ring PUFs. These may possess the same structure as the generic ring oscillator, however such PUFs may use self-timed rings instead of the inverter chains. The design may be based on the use of the Muller's C-element, a fundamental building block of asynchronous circuits. A significant benefit of self-timed rings may be that they make resulting PUF more immune to environmental variations. However, there may be an increase in the used silicon surface area. Furthermore, these self-timed structures may be prone to entering deadlock states. Intrinsic PUFS may include glitch PUFS; this may also involve a delay based PUF construction which may be based on glitch behavior of combinatorial logic circuits. Occurrence of glitches may be determined by the difference in delay of the different logical paths from the input to output. As with other delay-based methods, the exact circuit delays may be subject to silicon manufacturing variations, and the number and shape of resulting glitches on output signals may be unique and be used as a PUF response.

Continuing to refer to FIG. 1, PUF may include a circuit producing a PUF via cross-coupled logical or analog circuit elements. As a non-limiting example, static random-access memory 256 (SRAM) PUFs may be produced by cross-coupling two inverters and two access transistors. When the cell is powered up, the two cross-coupled inverters may enter a "power-struggle," where the winner is decided by the difference in the driving strength of the MOSFETs in the cross coupled inverters. Theoretically, there may be three possible states, where two are stable and one is metastable. If the transistors in the inverter circuits are perfectly matched, then the SRAM may remain metastable forever. Practically speaking, even though the transistors are designed to be identical, random variations in fabrication may ensure one has a stronger driving current, and this defines the initial start-up value for the cell. The majority of cells have an initial state that consistently may be returned to when powered up, and this is an important characteristic that allows them to be used for PUFs; a plurality of such cells may be used to generate a plurality of bits. Cross-coupling may be performed between other elements, such as without limitation a cell made up of two cross-coupled NOR gates (otherwise known as a latch); in operation, latch may be forced into an unstable state the resolution of which to either logic 1 or logic 0 may depend on slight mismatches between NOR gates. Similarly, a D flip-flop may be incorporated in a circuit that detects its power-up behavior. Alternatively or additionally, a PUF circuit may be fabricated by cross-coupling two transparent data latches, forming a bistable circuit. By leveraging the clear functionality of the latches, the circuit may be forced into an unstable state and converge when released to an output determined by slight manufacturing variations. Other examples of PUF in an embodiment include without limitation buskeeper PUFs, which may be similar to other PUFs based on bistable memory elements but leveraging buskeeper cells. PUF may also combine two or more PUF designs, for instance a bistable ring PUF, which may be a hybrid of a ring oscillator PUF and a SRAM PUF, wherein the structure is similar to the ring oscillator PUF, but the number of inverting elements is even. This may mean that the loop does not oscillate but is bistable (like the SRAM PUF). Using reset logic, the bistable ring may destabilize and subsequently stabilize into a state that is set by the random silicon manufacturing variations.

Continuing to view FIG. 1, PUF may include mixed-signal PUFs that produce a variable analog signal as determined by small circuit variations; analog signal may be converted to a digital signal using, for instance, an analog-to-digital converter, compared to a threshold voltage to produce a logic 1 or 0 output, or the like. PUFs may be constructed, as a non-limiting example, using threshold voltage PUFs: these may be constructed by connecting identically designed transistors in an addressable array may driving resistive loads; in operation, because of random silicon manufacturing variations, the transistor threshold voltages and current through the load may be random. Similarly, mixed-signal PUFs may include inverter gain PUFs, which may be based on the variable gain of equally designed inverters. The variable gain may be random because of random silicon process variations. Each challenge-response pair may be extracted from a pair of inverters. Mixed-signal PUFs may include super high information content (SHIC) PUFs, which may include an addressable array of diodes implemented as a crossbar memory 256 forms the structure; each diode may be, as a non-limiting example, produced by a crystal-growing process that seeds and produces random variation in crystal growth within the diode, resulting in unpredictably irregular I(U) curves. Read-out time of each memory 256 cell may be influenced by random silicon manufacturing variations and this forms a PUF response. Mixed-signal PUFs may include SRAM failure PUFs. Static noise margin for an individual SRAM cell may depend on random silicon manufacturing variations. As such, each SRAM cell may produce a bit failure at different noise levels, and this may be leveraged to generate a PUF response. In each case, the PUF circuit element producing the variable signal may be connected to an analog to digital converter, comparator, or similar element to produce one or more output bits.

In an embodiment, and still viewing FIG. 1 PUF may include a circuit implementing a quantum PUF. A quantum PUF, as used herein, is a PUF that generates secrets, such as random numbers, that are unique to the PUF owing to the nanostructure of atomic layers in an electronic or other component, so that the variations are governed by quantum physics, and harder to predict. Quantum PUF may include a quantum confinement PUF, which may operate by varying its output according to variations in behavior due to quantum confinement as determined by nanostructure of atomic layers of one or more components. In an embodiment, uniqueness of a quantum PUF or quantum confinement PUF may be made highly probable by the inherently random nature of atomic positions and imperfections in a quantum well. Simulating structures on such a scale may require computationally infeasible amounts of computing power, even for some quantum computers, particularly where multiple quantum PUF elements are used together; infeasibility may be enhanced by the unknown nature of the nanostructures, which may be impossible to determine without atom-by-atom dismantling.

Still referring to FIG. 1, implementation of quantum confinement PUFs may be achieved using any device that can measure phenomenological properties arising from behavior governed by quantum mechanics, such as without limitation properties governed by quantum confinement. Implementation may, as a non-limiting example for illustrative purposes, involve characterizing fluctuations in tunneling through quantum wells in resonant tunneling diodes (RTDs); an RTD may permit electrons to tunnel through it directly where voltage across the RTD places an energy level at a conduction band minimum. As confined energy level may be exponentially sensitive to width and height of a quantum well determined by atomic-level variations, such as variations atomic uniformity at interfaces between layers in RTD, this may cause the required voltage for tunneling to vary according to such variations in RTD, causing RTD behavior to be dictated by such variations. Such diodes may, in a non-limiting example, be constructed by fabricating from an InGaAs/AIAs double-barrier structure, formation of top and bottom ohmic contacts, and etching, which may be wet-etching, to isolate the resulting component from other structures on the die. Quantum confinement PUF may function, as a non-limiting example, through measuring electronic properties, for instance by determining current/voltage response of one or more RTDs, other types of diodes and/or combinations of various types of diodes (in any parallel or series arrangement) and analyzing the resultant curves for peak values, slopes, gradients, valleys, full-width-half-max, number of peaks, or other component identified by the current-voltage response that would serve as a uniquely identifying characteristic. Confined energy levels may be highly sensitive to the specific nanostructure within each RTD, leading to a distinct tunneling spectrum for every device. As a non-limiting example, measurement may be performed by finding currents corresponding to energy levels by sweeping voltage across each RTD through a range and recording the resulting currents. Multiple RTDs may be combined to increase output complexity, for instance by coupling together in series or by using a crossbar structure as for other diode based PUFs.

Continuing to refer to FIG. 1, as persons skilled in the art will be aware upon reviewing the entirety of this disclosure, variations may be applied to RTDs and/or manufacture of RTDs to increase a degree of variation in response from one RTD to another. For instance, RTDs may be selected and/or manufactured to have a double barrier rather than a single barrier, causing behavior to depend on four barrier interfaces rather than two barrier interfaces. Variations may include incorporation of a ternary material into quantum well. Variations may include manipulations of manufacturing steps to create uniqueness, such as without limitation inducing variations in molecular bean epitaxy growth, for instance by not rotating a sample stage during a particular step; this may introduce 1-monolayer variations at barriers, which may induce additional I-V characteristic variations. In an embodiment, such variations may also render the RTD-based PUF more tamper-resistant, as invasive probing of device would distort nanostructure and change the outputs; alternatively or additionally, a PUF manufactured in this way may be reconfigurable by, for instance, a controlled application of heat causing modifications to the nanostructure. Implementation variations may further include exploitation of changes in PUF response due to local variations in temperature and magnetic field; such changes would be unknown to an attacker and may enable the production of multiple unique IDs based on such fluctuations, in a manner unpredictable even to the manufacturer.

With continued reference to FIG. 1, other elements or components may be used instead of or additionally to RTDs to exploit variations in quantum-physical behavior based on nanoscale variations. Such elements or components may include, without limitation, three-dimensional nanostructures, such as quantum dots, which typically have many electron and hole confinement levels. RTDs or similar elements may be modified to contain single, or a few, dots, converting this increase in the number of confined states to an increased number of peaks in their dI/dV curves; each peak, when fitted individually and combined, could form part of a unique key for a circuit that generates and/or uses secrets specific to secure computing module 108 and/or a device containing secure computing module 108. A number of dots in a device such as an RTD does may not be reproducible or may be allowed to vary. There may be many constructions of quantum PUFs and/or quantum-confinement PUFs based on these principles as will be evident to those skilled in the art, upon reviewing the entirety of this disclosure, including without limitation use of alternative or additional structures or components incorporating two or three-dimensional features evincing electrical behavior that varies based on quantum-physical properties affected by nanoscale manufacturing variations.

Continuing to view FIG. 1, other applications of other types of PUFs, such as uniquely identifying a particular material good based on, for example, a unique pattern developed due to the details of how the part was manufactured, extruded, finish coating was sprayed, etc., either across the part or at one or more points on the part, may also be implemented or exploited. These details may include optical reflection/scattering at one or more of the material interfaces, the measurement of this optical response, and optionally the computation of a digital bit string uniquely identifying or representing the optical response.

With continued reference to FIG. 1, PUT may include, without limitation, PUFs implemented using design of vertical interconnect accesses (VIAs) in multi-layered chips or integrated circuits. A "VIA-PUF" may be created by, without limitation, designing VIAs with a small enough size that there is a roughly equal chance that they will or will not be created; this may cause the VIAs that function in the completed circuit to be randomly placed, leading to circuit behavior that is not predictable ahead of time. The above-mentioned randomness generated by random VIA creation may cause the resulting circuit to behave as a PUF. Such a VIA-PUF may be extremely robust over time and across environmental conditions.

Continuing to refer to FIG. 1, PUF may include one or more photonic PUFs. In an embodiment, a photonic PUF may take advantage of the fact that some photonic devices can operate in a non-linear and/or chaotic manner. In a non-limiting example, a photonic PUF is manufactured by creating a microcavity in a material, such as silicon; microcavity may be formed with a chamfer. Microcavity may be formed, as a non-limiting example with a diameter on the order of tens of micrometers; for instance, microcavity may have a 30-micrometer diameter in an exemplary embodiment. Chamfer size and position may be varied between microcavities; arbitrarily positioned holes may be formed in an interior surface of one or more microcavities to induce irregularities; further irregularities may be introduced as an inevitable result of limits on manufacturing consistency. Irregularities may create variable reflective and/or refractive responses to a pulse of light, which may include, as a non-limiting example, a pulse in the femtosecond to attosecond range, such as, for illustrative purposes only, a 175-femtosecond pulse from a model-locked laser having a 90-MHz repetition rate. Fabrication may include incorporation of the light source. In operation, Optical output waveforms may also be complex and highly sensitive to precise physical cavity structure; at the same time responses may remain highly repeatable. Continuing the example, ultra-short optical pulses (e.g. in the femtosecond to attosecond region) may be used to probe microcavities; the pulses may excite a unique combination of spatial optical modes that may interact with fine-scale structure of cavity interiors and with one another through optical nonlinearity of silicon. Each sequence of optical responses may contain spatiotemporal features that are extremely sensitive to cavity structures. It may be possible to extract long binary keys, including keys on the order of gigabytes, from a single micro-cavity PUF. Alternative or additional non-linear photonic devices may be used to implement a photonic PUF.

Further viewing FIG. 1, other examples of PUF that may be used may include, without limitation, nano electromechanical (NEM) PUFs. NEM PUFs may include PUFs that leverage stiction of a silicon nanowire to a binary gate structure. NEM PUFs may include those based on interfacial magnetic anistropy energy, such as use of the random distribution of magnetization orientation originating from the sub-nanometer variation of oxide layer produced by the thinning process. In an embodiment, an NEM PUF system may be highly robust; as a non-limiting example, NEM PUF may work effectively across a wide range of environmental conditions, including without limitation thermal variation, exposure to microwave radiation, and exposure to high dose radiation at various frequencies. Additional methods for PUF implementation may include, without limitation Kirchhoff-law-Johnson-noise (KLJN) PUFs, which may use KLJN key exchange to generate, between two hardware components, a new and manufacturer-unknown secret key which may be stored locally in, for instance, secure hash memory.

Still referring to FIG. 1, in an embodiment, one or more bits may be output directly from the PUF and/or TPM; such outputs may be used to generate symmetric or asymmetric keys, private keys, zero-knowledge proofs, or other proofs of authenticity, as described in further detail below.

Continuing to refer to FIG. 1, secure computing module 108 may implement one or more secure memory storage protocols. One or more secure memory storage protocols may be protocols designed to prevent unauthorized access to memory and/or to protect secure computing module 108 from attacks compromising memory; secure memory storage protocols may prevent, as a non-limiting example, compromise of memory used for computation. In an embodiment, one or more memory elements may be located within a trusted computing boundary (TCB); TCB may be a boundary within which it is physically, information-theoretically, or computationally infeasible for exterior computing elements to probe, manipulate, access, or otherwise interact with elements under control of or incorporated in secure computing module 108. For instance, and without limitation, it may be infeasible to physically probe the memory or access the memory from other software elements. In some embodiments, one or more memory elements may be located outside of trusted computing boundary. In some embodiments, a memory interface uses algorithmic techniques to randomize memory access patterns, for instance using obfuscated access, oblivious RAM, or ORAM. Such algorithmic techniques may implement one or more randomization techniques. In an embodiment, when crossing a trusted computing boundary, a memory interface data bus may be encrypted; that is data passed to the memory interface data bus may be encrypted using any hardware or software-based encryption techniques discussed in this disclosure. In an embodiment, secure computing module 108 may incorporate a memory controller located within the trusted computing boundary to encrypt and authenticate by a secret key memory elements such as without limitation memory page tables and/or memory pages accessible by other software elements, such as an operating system. Various techniques, processes, means or elements may be used to implement the above-described secure memory protocols. For instance, secure computing module 108 may use hardware-enabled access control to protect memory access; hardware access control may, as a non-limiting example, be performed by tagging each memory entry with a "container identifier" corresponding to a page, file, or other grouping of memory, enabling secure computing module 108 to determine whether tampering has occurred.

Secure computing module 108 may perform one or more safe-sharing protocols for hardware shared with other resources; for instance, where an exception, termination of a programmed process, or other condition causes a secured process to exit, shared registers may be reset to eliminate protected data prior to access by other processes. Secure computing module 108 may operate using one or more dedicated memory objects, registers, or storage elements; as a non-limiting example, secure computing module 108 may operate with dedicated cache lines not available to other processes or circuits, preventing, e.g., stack or buffer overrun attacks to corrupt or steal data. Dedicated memory elements may be wired only to secure computing module 108; access to dedicated memory elements may be rendered impossible except by way of secure computing module 108. Secure computing module 108 may use one or more order-preserving memory storage protocols to detect "reset attacks" or fraudulent data entries presented out of order; such order preserving memory storage protocols may include, without limitation, Merkle trees or other hash trees in which each new entry contains a hash of a recently stored data entry and a hash of earlier Merkle tree and/or hash tree entries, rendering false or out-of-order entries computationally infeasible, or any temporally sequential listing as described below, including without limitation blockchains and the like. Secure computing module 108 may utilize oblivious random-access memory (RAM) wherein memory access patterns are obfuscated to prevent detection of memory access patterns by outside observers attempting to deduce execution details regarding processes performed using secure computing module 108. Secure computing module 108 and/or device incorporating secure computing module 108 may incorporate a trusted non-volatile storage device that provides some means of verification of secure storage capability and other properties. Memory protocols as described above may be used to implement methods of attested storage and the chain of trust beginning at PUF level up through processor, memory and code. Such mechanisms may be used to secure long-term storage (e.g. SSDs, spinning disks, tape, other), RAM, or other memory storage facilities. Persons skilled in the art, upon reviewing the entirety of this disclosure, will be aware of various ways in which memory storage, securing, encryption, measuring, and attesting techniques as disclosed herein may be implemented and/or utilized by or with secure computing module 108.

Still referring to FIG. 1, secure computing module 108 may include a secure processor. Secure processor may be a processor as described in this disclosure. Secure processor may operate autonomously from other processors and/or an operating system operating on at least a cryptographic evaluator; for instance, secure processor may store entries in temporary or long-term memory in encrypted form, where decryption is impossible without private keys not available to devices, circuits or software besides secure processor. Encryption may likewise be impossible without private keys available only to secure processor. Secure processor may also digitally sign memory entries using, for instance, a private key available only to secure processor. Keys available only to secure processor may include keys directly encoded in hardware of the secure processor; i.e., a process to digitally sign and/or encrypt using keys may be coded using logic circuits, field-programmable arrays, read-only memory, burning into memory using one-time programmable polysilicon fuses, or the like, and thus be immutable absent physical changes to secure processor. Secure processor may be constructed, similarly to TPM, to frustrate alteration and/or probing to discover and/or alter private keys. Private keys may be demonstrable as uniquely associated with secure processor by use of PUF as described above; secure processor may include, for instance, a TPM as described above. Alternatively or additionally, a certificate authority as in further detail below, which may be a manufacturer of secure processor, may verify that one or more public keys are associated uniquely with secure processor according to any protocol suitable for digital certificates.

With continued reference to FIG. 1, some embodiments of the disclosed systems and methods involve creation and/or evaluation of digital signatures. A digital signature as used herein is an application of a secure proof of a secret possessed by a particular device and/or user thereof to an element or lot of data, or to a verifiable mathematical representation of the element or lot of data, which may include a cryptographic hash as described above. A secure proof, as used herein, is a protocol whereby an output is generated that demonstrates possession of a secret, such as a secret stored in or produced by secure computing module 108 and/or PUF, without demonstrating the entirety of the secret; in other words, a secure proof by itself, is insufficient to reconstruct the entire secret, enabling the production of at least another secure proof using at least a secret. Where at least a secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a secret, for instance as used in a single challenge-response exchange. Identifier may be specific to remote device; alternatively or additionally, identifier may include a group identifier and/or signature or secure proof generated by a group key and/or secret as described above, identifying remote device through an anonymizing process such as without limitation DAA.

Still referring to FIG. 1, secure proof may include a zero-knowledge proof, which may provide an output demonstrating possession of a secret while revealing none of the secret to a recipient of the output. Zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. In a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, and still referring to FIG. 4, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be, as a non-limiting example, 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

With continued reference to FIG. 4, zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. In an embodiment, zero-knowledge proof may include PCPs based on interleaved Reed-Solomon codes. Persons skilled in the art, upon reviewing the entirety of this disclosure, will be aware of various forms of zero-knowledge proofs that may be used, singly or in combination, consistently with this disclosure.

Still referring to FIG. 4, secure proof may include be generated using a physically unclonable function and may utilize at least a random number generator (RNG), true random number generator (TRNG) or other source of entropy. For instance, and without limitation, an output of a PUF may be used to generate a private key for a digital signature as described above. Alternatively or additionally, a PUF output may constitute a secret to be used as a basis for a zero-knowledge proof, which may be any zero-knowledge proof as described herein.

Still referring to FIG. 4, secure computing module 108 and/or remote device may generate one or more elements of additional information, which may be referred to herein as "verification data" that user or device may use to evaluate secure proof. For instance, secure computing module 108 and/or remote device may generate a public key; public key may be provided automatically to any querying device. Alternatively or additionally, public key may be provided to a manufacturer of secure computing module 108, permitting manufacturer to act as a certificate authority for secure computing module 108. In an embodiment, public key may be generated using a recoverable key generation mechanism, as is described above for recoverable public/private key pairs via at least a PUF. Similarly, secure computing module 108 and/or remote device may generate data necessary to perform verification of a zero-knowledge proof by any verifier as described above. Such a verification datum may be included in authorization token as described in further detail below, permitting remote device to demonstrate its link to the token by providing a corresponding secure proof on demand.

With continued reference to FIG. 1, evaluating a secure proof may include receiving a verification datum corresponding to secure proof and evaluating the secure proof as a function of the verification datum. Verification datum, as used herein, is any datum that may be used to aid in evaluation of secure proof; for instance, where secure proof includes a digital signature generated using a private key of a public key cryptographic system, verification datum may include a corresponding public key. Similarly, where secure proof includes a zero-knowledge proof, verification datum may include verification data useable to verify zero-knowledge proof.

Continuing to refer to FIG. 1, a secure proof may include and/or be characterized as a digital signature. In an embodiment, digital signature may be any digital signature as described above; digital signature may be created by signing a mathematical representation of first dataset. A single key may be used in one or more digital signatures, such as signatures used to receive and/or transfer possession of crypto-currency assets; the key may be discarded for future use after a set period of time. In an embodiment, varied inputs including variations in local physical parameters, such as fluctuations in local electromagnetic fields, radiation, temperature, and the like may be combined with key-generation circuits or methods, such that an almost limitless variety of private keys may be so generated. In an embodiment, remote device and/or secure computing module 108 may convert immediate output from PUF into key in the form of a binary number. In non-limiting example, PUF may utilize at least a TRNG or other entropy source to provision an N bit secret vector $\vec{s}$ that is hashed via a cryptographic one-way function, in non-limiting example SHA256, SHA3 or the like, to create a seed for a key derivation function (KDF), in non-limiting example ED25519, generating at least a public/private key pair. At least a PUF may, in a non-limiting example, output an M bit vector $\vec{e}$ (or a subset of PUF output is truncated, multiple PUF outputs may be concatenated, or any combination thereof) which, combined with a public M×N bit matrix A and potentially public helper vector $\vec{b}$ satisfies the equation $\vec{b} = A\vec{s} + \vec{e}$, such that PUF output $\vec{e}$ and public helper data $\vec{b}$ and matrix A may be used to regenerate at least a secret $\vec{s}$. In an embodiment, bits of $\vec{e}$ that may be considered unstable or otherwise undesirable for purposes or stable regeneration may be discarded, resulting in associated reduction in length of $\vec{b}$ and A. This may be performed, without limitation, using a fuzzy extractor, such as those used to convert slightly variable signals from biometric samples or the like predictably into keys by having certain variation tolerances in the binary encoding process. Private key extraction may utilize additional corrective measures, including as a nonlimiting example machine learning, neural networks, convolutional neural networks and the like, or other approaches to provide error correction over the operating temperature range of the device, to ensure consistency in key extraction. Extraction may include extraction of a symmetric key; for instance, remote device and/or secure computing module 108 may extract one or more random numbers based on a PUF output to create a symmetric key as described above. Alternatively or additionally, extraction may include extraction of a private key of a public key cryptographic system.

Still referring to FIG. 1, key extraction may include use of a number output by a PUF or other circuit to generate a public and private key pair. For instance, such a number output may be used as a seed in an elliptic curve cryptographic system. In a non-limiting; example, output may include a random number generated within a desired interval, which may be achieved, for instance, by setting the number of output bits to be provided from a PUF; steps along a chosen elliptic curve may then be performed using random number to generate a public key. Initial point on elliptic curve and elliptic curve may be selected using an additional random number, which may be generated using any suitable method; random numbers associated with curves having known vulnerabilities may be discarded, according to mathematical descriptors or other characteristics of such vulnerabilities as stored in memory of or accessible to remote device and/or secure computing module 108. Persons skilled in the art, upon reading the entirety of this disclosure, will be aware of various ways in which a random number may be used to generate a private and public key pair consistently with this disclosure.

Still viewing FIG. 1, key extraction may utilize a numerical output from a PUF or other element of secure computing module 108 to generate an RSA private key or other private or symmetric public key; this may be accomplished, for instance, by using numerical outputs to generate RSA primes. RSA primes may be generated, as a general matter, by obtaining a random or pseudorandom odd number, checking whether that number is prime, and if it is not, repeatedly incrementing by 2, or some other amount leading to additional odd numbers, and rechecking until a prime is discovered. PUF and/or elements of secure computing module 108 may generate one or more random numbers, for instance by using one or more PUFs as described above; any suitable algorithm may be used for generating a prime from a random number to produce pairs of primes usable as RSA factors or other random numbers, public/private key, symmetric public key or the like. Random numbers below a threshold size may be discarded, and other filtering processes may be employed to discard potentially insecure prime factors. Persons skilled in the art, upon reviewing the entirety of this disclosure, will be aware of many suitable methods for creating RSA primes, and using such primes to generate RSA keys, using random numbers output by PUFs or other elements. Keys may be used to generate exponents for a cryptographic system such as Diffie-Helman or ElGamal that are based on the discrete logarithm problem.

Continuing to view FIG. 1, a digital signature may be generated using a digital signature using a direct anonymous authentication protocol (DAA). In an embodiment, DAA is an anonymous digital signature scheme, which instead of reliance on a certificate authority to link a particular private key to a particular party, uses reference to a group public key or to multiple public keys to verify an anonymous signature. A secure computing module 108 may act as a "first signer" of a digital signature, signing with a private key produced from a secret generator as described above, which may be a group key. In an embodiment secure computing module 108 signs an element of data using the private key. A second signer, which may include a manufacturer device or another device endorsing key and/or secret used for first signing may previously or subsequently sign the element of data and/or a verification datum associated with the secure proof and/or digital signature used for first signing; alternatively or additionally, second signer may use information or signature elements provided by secure computing module 108 to perform a digital signature. This process may, for instance, enable generation of novel secret keys using additional circuitry, to demonstrate, for instance, timeliness of execution and frustrate delay-based attacks. DAA may perform digital signature using a zero-knowledge proof; for instance, any non-interactive zero-knowledge proof and/or zero-knowledge proof that may be made non-interactive may be used to generate digital signature, where signature may be, for instance, the proof algorithm output, while verification program, trusted setups where needed, or the like may be publicly available for evaluation of digital signature, i.e. of the proof. Similar processes may be performed, such as without limitation Intel EPID. Where a manufacturer or other device signs group public key and/or verification datum, such signature may be provided, distributed to one or more verified nodes, or the like.

Still viewing FIG. 1, one or more digital signatures may be created in delegable forms, and/or in forms that may be modified, anonymized, or the like. For instance, and without limitation, digital signatures may be implemented according to any embodiments described in Provisional Application No. 62/815,493, filed on Mar. 8, 2019, and entitled "METHODS AND SYSTEMS FOR IMPLEMENTING AN ANONYMIZED ATTESTATION CHAIN," the entirety of which is incorporated herein by reference.

With continued reference to FIG. 1, a digital signature may include an encrypted mathematical representation of a file or other set of data using the private key of a public key cryptographic system. Signature may be verified by decrypting the encrypted mathematical representation using the corresponding public key and comparing the decrypted representation to a purported match that was not encrypted; if the signature protocol is well-designed and implemented correctly, this means the ability to create the digital signature is equivalent to possession of the private decryption key. Likewise, if mathematical representation of file is well-designed and implemented correctly, any alteration of the file will result in a mismatch with the digital signature; the mathematical representation may be produced using an alteration-sensitive, reliably reproducible algorithm, such as a hashing algorithm as described in further detail below. A mathematical representation to which the signature may be compared may be included with signature, for verification purposes; in other embodiments, the algorithm used to produce the mathematical representation is publicly available, permitting the easy reproduction of the mathematical representation corresponding to any file.

Still referring to FIG. 1, in an embodiment, persons, devices, or transactions may be authenticated or assigned a confidence level using digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In an embodiment, and with continued reference to FIG. 1, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature. In other embodiments where trust in a single certificate authority is undesirable (e.g., where there is concern of the certificate authority and verifier colluding), the same functionality may be accomplished by a group of certificate authorities acting to authenticate in coordination, with the requirement that a threshold number of the group of certificate authorities, and/or a threshold proportion of the group of certificate authorities, agree (e.g. "threshold cryptography"); a confidence level in each certificate authority may be determined according to any method or means described herein for determination of a confidence level in any device or entity, including without limitation in a cryptographic evaluator as described in further detail below. In an embodiment, certificate authorities that have a confidence level below a given threshold level may be eliminated; in other embodiments, certificate authority confidence levels may be aggregated according to any method shown herein. Aggregate confidence level may be used for threshold cryptography as described above; for instance, agreeing certificate authorities may have an aggregate confidence level which must exceed a threshold, or aggregate confidence level of agreeing certificate authorities may be required to represent a threshold proportion of aggregate confidence level of all certificate authorities in group. Additional embodiments may include group signature schemes that issue certificates on a membership public key generated by a secure computing module 108 as described in further detail below; in such scenarios, authentication may include proof by the secure computing module 108 that the secure computing module 108 possesses a secret key to a public key/certificate pair.

Still referring to FIG. 1, certificate authority may be implemented in a number of ways, including without limitation as described in Provisional Application No. 62/758,367, filed on Nov. 9, 2018, and entitled "METHOD AND SYSTEMS FOR A DISTRIBUTED CERTIFICATE AUTHORITY," the entirety of which is incorporated herein by reference; for instance, and without limitation, certificate authority may include, be included in, and/or be implemented as a distributed certificate authority as described in Provisional Application No. 62/758,367.

With continued reference to FIG. 1, secure computing module 108 may implement one or more methods of attested computation. Attested computation may include or involve one or more methods to ensure that computation of a program, known as an attested program, is trusted and signed by secure computing module 108 and/or computing device incorporating secure computing module 108; this may be supported by means to assert the state of the system memory, code, and input data. In an embodiment, attested computing may include or involve one or more methods to authenticate a boot loader. An authenticated boot loader may include a first code that the secure computing module 108 may run upon system initialization and is responsible for checking the measurements and/or signatures of subsequent components either locally or by utilizing a piece of trusted hardware such as a TPM. Authenticated boot loaders may differ in practice by how they obtain their attestation root key, whether a root of trust for measurement/verification differs from the root of trust for attestation, and whether components are verified using a signature, in non-limiting examples, but are considered for purposes of this description secure or authenticated boot loaders. Attested computation may further rely upon secure microcode and/or a trusted software component, and/or secure signing enclaves, which are constructions that protect memory access from operating system level operations. Attested computation may rely upon wholly or in part on a measurement root, which computes a cryptographic hash of a trusted software component, and/or may generate a trusted software component attestation key pair and certificate based on the trusted software component's hash. In a representative embodiment, measurement root may read the processor key derivation secret and derive a symmetric key based upon the trusted software component's hash. In an embodiment, the trusted software component may contain a header that contains the location of the attestation existence flag. In an embodiment, the measurement root may produce an attestation certificate by signing the trusted software component's private attestation key. The measurement root may generate a symmetric key or other cryptographic key for the trusted software component so it may encrypt its private attestation key and store it in untrusted memory. Attestation may be used to attest any computing process and/or datum, including without limitation sensor readout, attested time, attested geographical data such as without limitation global positioning system (GPS) data, and the like.

In an embodiment, secure computing module 108 and/or a computing device incorporating secure computing module 108 may compute a cryptographic hash of a system state when performing a trusted computation. System state may include, without limitation, program code and/or one or more elements of data being computed. A resulting cryptographic hash of system state may be stored in one or more trusted or secured memories as described above. Secure computing module 108 and/or computing device incorporating secure computing module 108 may append a cryptographic signature based upon any private key that may be associated with secure computing module 108 as described herein. Secure computing module 108 and/or computing device incorporating secure computing module 108 may operate a security reset of working memory prior to load of data for trusted computation; for instance, the secure computing module 108 and/or computing device incorporating secure computing module 108 may append a hash of the memory to cryptographic hash of system state following reset and prior to loading data. Secure computing module 108 and/or computing device incorporating secure computing module 108 may append its authentication signature of memory page tables and/or memory tables. Upon completion of the trusted computation, which may include execution of program code of system state, secure computing module 108 and/or computing device incorporating secure computing module 108 may append an output value of the trusted computation to cryptographic hash of system state. In an embodiment, an output value of the trusted computation may itself be cryptographically hashed and/or encrypted; encryption may be performed using any form of hardware or software-based encryption that may be associated with secure computing module 108. Secure computing module 108 and/or computing device incorporating secure computing module 108 may include a system to compute one or more hash trees of cryptographic hash of the computation, system state, and/or outputs; secure computing module 108 and/or computing device incorporating secure computing module 108 may store the one or more hash trees within the trusted computation boundary. Hash trees may be appended to the trusted computation hash. Any process steps or components described above as performing trusted and/or attested computing may be performed or omitted in any order or combination as will be apparent to those skilled in the art, upon reading the entirety of this disclosure; for instance, order of appending data may be done in any combination.

Still referring to FIG. 1, examples of a secure computing modules 108 may include, without limitation, TPM as described above. The secure computing module 108 may include TPM combined with a boot-measuring protocol using hash trees, Merkle trees, or the like to measure boot entries to create an "attested boot," additionally or separately from the attested computation description described above. A secure computing module 108 may include a trusted execution technology (TXT) module combining a TPM with establishment of a secure container at run-time; secure container may be isolated from a software stack and OS of at least the transaction authentication node 104 and/or use TPM to measure and attest to secure container prior to launch. Secure computing module 108 may implement a trusted enclave, also known as a trusted execution environment (TEE). In an embodiment, a trusted enclave may be a portion of a computing device that is isolated from the main processor of the computing device. Isolation may be achieved using elements of secure computing module 108 as described above, including isolation of memory. Isolation of memory may be achieved through any process or architecture as described above for secure memory, including encryption using a cryptographic system a decryption and/or encryption key to which a secure processor or TPM has access, but to which a CPU or other main processor, as well as input/output devices or connections, does not and/or use of dedicated cache lines or the like to physically separate memory accessible to secure computing module 108 from CPU and/or input/output devices or connections. Inputs and outputs to and from trusted enclave may be restricted and controlled tightly by a secure processor and/or TPM as described above. Trusted enclave may perform trusted and/or attested computing protocols as described above, including without limitation attested boot protocols. Examples of trusted enclaves include without limitation those enabled by SOFTWARE GUARD EXTENSIONS (SGX) systems as promulgated by Intel Corporation of Santa Clara, Calif. RISC V architecture, including without limitation sanctum processors, Ascend secure infrastructure, Ghostrider secure infrastructure, ARM TrustZone, Trusted Little Kernel (TLK) as promulgated by Nvidia Corporation of Santa Clara, Calif., and Secure Encrypted Virtualization (SEV) as promulgated by Advanced Micro Devices, Inc. of Santa Clara, Calif., and/or any other suitable architecture. Persons skilled in the art, upon reviewing the entirety of this disclosure, will be aware of various additional or alternative trusted computing processes that may be used to implement secure computing module 108, TEE, or trusted enclaves as disclosed herein. System 100 may incorporate or communicate with a certificate authority, which may include any certificate authority and/or version thereof as described in this disclosure.

With continued reference to FIG. 1, one or more devices in communication with system 100 and/or incorporated in system 100 may be verified nodes. A "verified node" as used in this disclosure is a computing device that has been identified by a protocol recognized as valid by devices and/or users in system 100 as being trustworthy for a given purpose; purpose may include acting as a timestamp authority and/or generating secure timestamps as described in further detail below, acting as a certificate authority and/or a component of a distributed certificate authority as described above, and/or being trusted up to assumptions of one or more protocols. For instance, and without limitation, a verified node may be assumed in some embodiments as generating a reliable secure timestamp, trustworthy localization data, and/or trustworthy sensor data; trustworthiness may include, in a non-limiting example, an assumption that any inaccuracies are due to equipment failure rather than malice or fraud, or may include an assumption of a certain degree of accuracy, which may still be verified according to other processes as described herein. Verified nodes may be recorded in a verified node listing 112, which may include any suitable data structure for description and/or listing of elements of data, including without limitation distributed data structures such as temporally sequential listings as described in further detail below.

Still referring to FIG. 1, at least a temporal attestor 104 is configured to generate a secure timestamp. A "secure timestamp," as used in this description, is a cryptographically secure timestamp representing a current moment in time as determined by an electronic and/or computing device such as at least a temporal attester 104. A current moment in time may include a current time in any time-zone, including without limitation Greenwich Meridian Time (GMT) or any other time zone arithmetically related thereto. A current moment in time may include a given number from a reference time or date, of seconds, oscillations and or periodic repetitions of a material and/or oscillating or otherwise periodic physical phenomenon such as used in precision and/or atomic oscillators, or other units or phenomena suitable to measure time in regular increments, and/or any mathematical equivalent thereof such as times, dates other textual or visual representations of time created by aggregating detected temporal increments and/or units as described above into seconds, minutes, hours, days, weeks, months, years, or the like. As a non-limiting example, a current time may be represented using elements that include without limitation a Julian date, a date on a calendar such as a Gregorian, Mayan, or other calendar or variations thereof, time of day according to any time zone, and/or any suitable combination of horological elements into timestamps according to any protocol currently used and/or any protocol that may occur to persons skilled in the art upon reviewing the entirety of this disclosure.

With continued reference to FIG. 1, at least a temporal attester 104 may include a local clock 116. Local clock 116 may be any device used for measurement of time; local clock 116 may include without limitation an oscillator, such as a crystal oscillator, a mechanical oscillator or escape mechanism, an atomic oscillator such as a Cesium-based clock. Local clock 116 may include a memory; for instance, local clock 116 may include a memory containing a current time at some point in time, which local clock 116 may increment according to measurements of oscillator. Current time may include a date as recorded using any calendar system, a time of day, a number of seconds that have elapsed since some accepted or recorded benchmark time, a Julian date, or the like. Local clock 116 and/or at least a temporal attester 104 may compare time generated by local clock 116 to a reference time received from another device; reference time may, for instance be received from a reference clock, or a network in communication with a reference clock. In an embodiment, reference clock may be a precision reference clock, in nonlimiting example an atomic reference clock e.g. a Cesium-based clock. Local clock 116 and/or at least a temporal attester 104 may modify or correct current time as calculated using local clock 116, as a function of reference local clock 116; for instance, where current time according to local clock 116 differs from current time according to reference clock, local clock 116 and/or at least a temporal attester 104 may modify current time of local clock 116 to match current time according to reference clock. Local clock 116 and/or at least a temporal attester 104 may perform additional functions to maintain an accurate current time, such as without limitation changes to account for movement into a new time zone, seasonal time change protocols such as daylight savings time, or the like. Local clock 116 may be periodically synchronized to a global clock reference via in non-limiting example network time protocol (NTP), a trusted timestamping procedure with one or more third party clocks, or other means as will be apparent to those skilled in the art upon reviewing the entirety of this disclosure Still referring to FIG. 1, secure timestamp may be recorded by recording a current moment in time as described above in a hash chain. In an embodiment, a hash chain includes a series of hashes, each produced from a message containing a current time stamp (i.e., current at the moment the hash is created) and the previously created hash, which may be combined with one or more additional data; additional data may include a random number, which may be generated for instance using a secure computing module 108. Additional data may include one or more additional data, including sensor data or a hash of data, that are received or generated by a processor. Additional data may be hashed into a Merkle tree or other hash tree, such that a root of the hash tree may be incorporated in an entry in hash chain. It may be computationally infeasible to reverse hash any one entry, particularly in the amount of time during which its currency is important; it may be astronomically difficult to reverse hash the entire chain, rendering illegitimate or fraudulent timestamps referring to the hash chain all but impossible. A purported entry may be evaluated by hashing its corresponding message.

With continued reference to FIG. 1, generating a secure timestamp may include digitally signing the secure timestamp using any digital signature protocol as described above. In one embodiment authenticity of received data signals is established by utilizing a chain of attestation via one or more attestation schemes, including without limitation any attestation schemes, chains, processes, or the like refer to above or in materials incorporated herein by reference, to verify that a device, secure computing module 108, or the like signing and/or generating as secure timestamp is authorized, trusted, or otherwise associated with a given confidence level or other manner of assessing a degree of reliability thereof. A secure timestamp may include one or more additional elements of data, including without limitation a timestamp identifier, which may be any number and/or other textual datum identifying newly generated timestamp; timestamp identifier may be unique, for instance as generated using universally unique identifier (UUID) and/or globally unique identifier (GUID) processes and/or protocols. A secure timestamp may include an identifier indicating a security policy under which the secure timestamp was generated. Digital signatures used to sign a secure timestamp may be created using keys and/or secrets dedicated to the purpose of signing secured timestamps; this may be indicated on one or more digital certificates, notices, or the like.

In an embodiment, and still referring to FIG. 1, secure timestamps may be generated using a timestamping authority (TSA) 120, which may be any device or set of device that are trusted to generate a timestamp. A TSA 120 may include a certificate authority, which may be any certificate authority as described in this disclosure and/or in any material incorporated herein by reference. A TSA 120 may include a trusted third party (TTP). A TSA 120 may be recorded in a verified node data listing as described above, or otherwise granted or determined to possess trusted status. In an embodiment, and as a non-limiting example, data, such as without limitation data signals received from sensors, sensing device 124s, or other components of system 100 as described in this disclosure may be sent to a TSA 120; data may, without limitation, be locally processed at the listener device by a one-way function, e.g. a hash function which may be transmitted to a TSA 120. In an embodiment, a secure timestamp may be generated that appends a timestamp to the hashed output data, applies a TSA 120 private key and/or other secure proof of secret information available to the TSA 120 to sign the hashed output data concatenated to the timestamp, and returns this signed, a.k.a. trusted timestamped data back to a requesting device. A device generating a secure timestamp, including without limitation a TSA 120, a device acting as part of a TSA 120, and/or at least a temporal attester 104, may evaluate one or more elements of cryptographic data, including digital signatures, cryptographic hashes, and the like, that are provided as, with, and/or as representing sensor data, localization data, or the like. At least a Temporal attestor may be and/or act as a TSA 120.

In an embodiment, and with continued reference to FIG. 1, system 100 may utilize a distributed trusted time and/or TSA 120 protocol. In an embodiment, distributed trusted time may be established using at least a verified node, a monotonic counter and current local timestamp of at least a secure computing module 108, and a device signature. In such a scheme, a secure computing module 108 may make a sampling of local machine reference time-base into at least a secure enclave, and increment a monotonic counter also residing in the secure enclave. Secure computing module 108 may sign a message containing local machine reference time and monotonic counter and broadcast this signed message. This process may occur at regular time intervals where the time interval T is less than the allowable clock skew of local machine reference timebase utilized in verified node, such that any device described in this disclosure and/or user thereof may readily determine whether an unexpected lapse forward or backward in distributed timebase is result of clock skew or a malicious actor attempting to falsify a timestamp. Distributed time may further utilize two or more such verified nodes broadcasting signed local machine reference timebases, their result being averaged or otherwise corrected. Verified nodes selected to perform distributed time broadcast may be pre-defined and/or listed in verified node listing 112, or may selected via random oracle, for instance and without limitation via random oracle protocols as described in Provisional Application No. 62/758,367, which is incorporated herein by reference. Averaging or otherwise correcting outputs from multiple broadcasting local machine reference timebases may be done by any or all devices in system 100 and/or as described in this disclosure, or may be performed by a selected at least a random leader, which may be selected without limitation via random oracle; in the latter case, broadcast from the averaging at least a random leader may further incorporate a monotonic counter and signature as described above. Rotation of selection of devices performing the above-described process may occur periodically; and or periodically be renewed, for instance and without limitation using authorization tokens or similar protocols and/or elements of data as described Provisional Application No. 62/758,367, which is incorporated herein by reference. At least a temporal attester 104 may participate in generation of any TSA 120/distributed timestamp protocols as described above, including in any role described above for verified nodes.

In an embodiment, and still referring to FIG. 1, a trusted timestamp may be generated according to any existing trusted timestamping protocol, such as without limitation a protocol as implemented according to RFC 3161, and/or any variation thereof, or may incorporate any element and/or elements of such a protocol. Use of secure timestamps as described herein may enable systems and methods as described herein to instantiate attested time. Attested time is the property that a device incorporating a local reference clock may hash data, e.g. sensor data, along with the local timestamp of the device. Attested time may additionally incorporate attested identity, attested device architecture and other pieces of information identifying properties of the attesting device. Verification of a trusted and/or secure timestamp may be performed via verification of hashes, digital signatures, and/or identity of device or devices acting as TSA 120, temporal attestor, or the like, according to any suitable process for verification as described in this disclosure.

With continued reference to FIG. 1, at least a temporal attester 104 may be included in any other suitable device. For instance, at least a temporal attester 104 may be included in a satellite, including without limitation a satellite as used in geosynchronous orbit, defined as an orbit wherein the satellite remains in a relatively fixed location above the earth. Alternatively or additionally, at least a temporal attester 104 may include one computing devices; at least a temporal attester 104 may include a plurality of devices, each of which may include any features, or perform any protocol, described above for at least a temporal attester 104.

Figure 2:
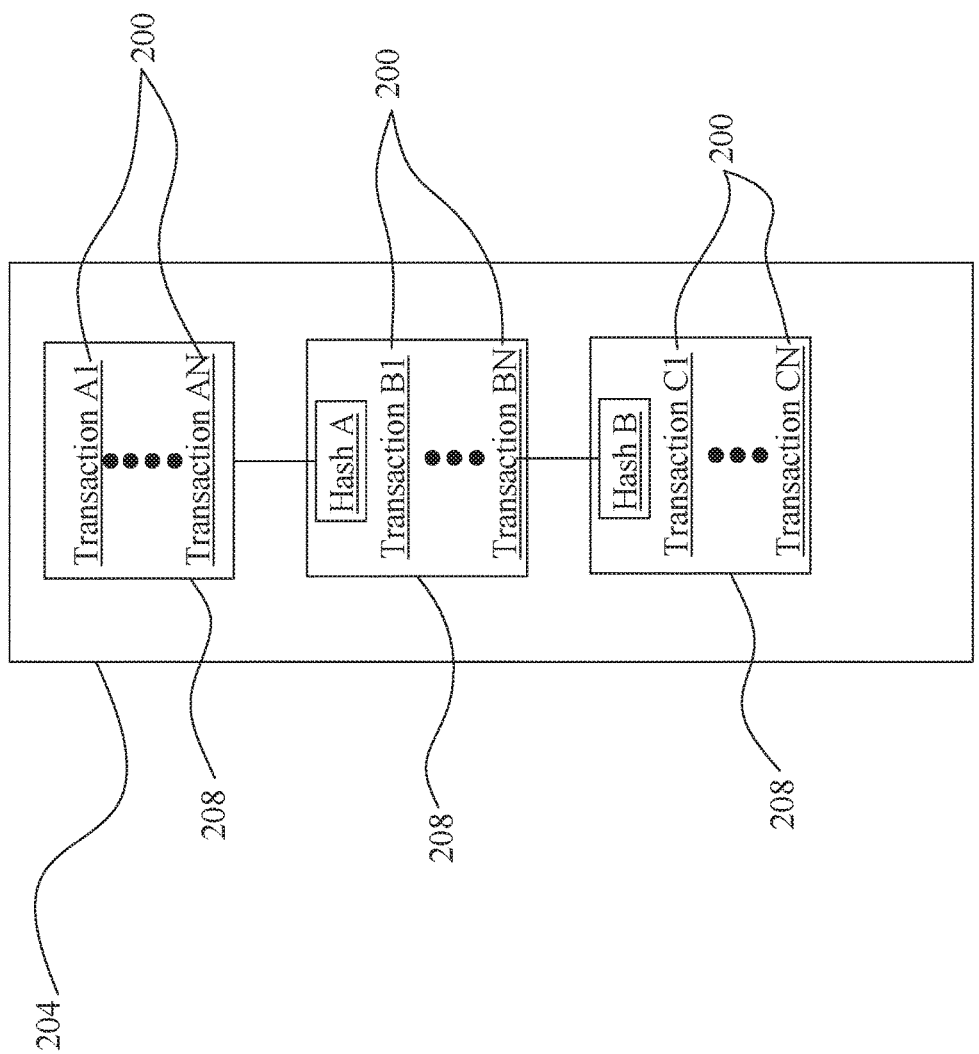
FIG. 2 is a block diagram illustrating an exemplary embodiment of a temporally sequential listing.

Referring now to FIG. 2, elements of system 100, including without limitation at least a temporal attester 104, may be used to perform one or more processing steps necessary to create, maintain, and/or authenticate a digitally signed assertion 200. In one embodiment, at least a digitally signed assertion 200 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 200. In an embodiment, collection of textual data states that the owner of a certain transferable item represented in the at least a digitally signed assertion 200 register is transferring that item to the owner of an address. At least a digitally signed assertion 200 may be signed by a digital signature created using the private key associated with the owner's public key, as described above. For instance, at least a digitally signed assertion 200 may describe a transfer of virtual currency, such as crypto currency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. At least a digitally signed assertion 200 may describe the transfer of a physical good; for instance, at least a digitally signed assertion 200 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with the at least a digitally signed assertion 200 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 2, in one embodiment, an address is a textual datum identifying the recipient of virtual currency or another item of value in at least a digitally signed assertion 200. In some embodiments, address is linked to a public key, the corresponding private key of which is owned by the recipient of the at least a digitally signed assertion 200. For instance, address may be the public key. Address may be a representation, such as a hash, of the public key. Address may be linked to the public key in memory of a computing device, for instance via a "wallet shortener" protocol. Where address is linked to a public key, a transferee in the at least a digitally signed assertion 200 may record a subsequent at least a digitally signed assertion 200 transferring some or all of the value transferred in the first at least a digitally signed assertion 200 to a new address in the same manner. At least a digitally signed assertion 200 may contain textual information that is not a transfer of some item of value in addition to, or as an alternative to, such a transfer. For instance, as described in further detail below, at least a digitally signed assertion 200 may indicate a confidence level associated with a cryptographic evaluator as described in further detail below.

With continued reference to FIG. 2, at least a digitally signed assertion 200 may be included in a temporally sequential listing 204. Temporally sequential listing 204 may include any set of data used to record a series of at least a digitally signed assertion 200 in an inalterable format that permits authentication of such at least a digitally signed assertion 200. In some embodiments, temporally sequential listing 204 records a series of at least a digitally signed assertion 200 in a way that preserves the order in which the at least a digitally signed assertion 200 took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping.

Still referring to FIG. 2, temporally sequential listing 204 may preserve the order in which the at least a digitally signed assertion 200 took place by listing them in chronological order; alternatively or additionally, temporally sequential listing 204 may organize digitally signed assertions 200 into sub-listings 208 such as "blocks" in a block-chain, which may be themselves collected in a temporally sequential order; digitally signed assertions 200 within a sub-listing 208 may or may not be temporally sequential. In an embodiment, the temporally sequential listing may be a directed acyclic graph (DAG), in which multiple branches may be generated on or by different devices implementing temporally sequential listing 204, and branches may be merged into one another, while a hash chain or similar structure ensures that branches cannot go "back in time" whether merged or not; secure timestamps and/or attested time may be further included to impose a temporal order on a DAG or other temporally sequential listing 204.

With continued reference to FIG. 2, temporally sequential listing may preserve an order in which at least a digitally signed assertion 200 took place by listing them in sub-listings 208 and placing the sub-listings 208 in chronological order. The temporally sequential listing 204 may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a digitally signed assertion 200 to the ledger, but may not allow any users to alter at least a digitally signed assertion 200 that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Temporally sequential listing 204 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 2, temporally sequential listing 204, once formed, cannot be altered by any party, no matter what access rights that party possesses. For instance, temporally sequential listing 204 may include a hash chain, in which data is added during a successive hashing process to ensure non-repudiation. Temporally sequential listing 204 may include a block chain. In one embodiment, a block chain is temporally sequential listing 204 that records one or more new at least a digitally signed assertion 200 in a data item known as a sub-listing 208 or "block." An example of a block chain is the BITCOIN block chain used to record BITCOIN transactions and values. Sub-listings 208 may be created in a way that places the sub-listings 208 in chronological order and links each sub-listing 208 to a previous sub-listing 208 in the chronological order, so that any computing device may traverse the sub-listings 208 in reverse chronological order to verify any at least a digitally signed assertion 200 listed in the block chain. Each new sub-listing 208 may be required to contain a cryptographic hash describing the previous sub-listing 208. In some embodiments, a temporally sequential listing contains a single first sub-listing 208, sometimes known as a "genesis block."

Still referring to FIG. 2, the creation of a new sub-listing 208 may be computationally expensive; for instance, the creation of a new sub-listing 208 may be designed by a "proof of work" protocol accepted by all participants in forming the temporally sequential listing 204 to take a powerful set of computing devices a certain period of time to produce. Where one sub-listing 208 takes less time for a given set of computing devices to produce the sub-listing 208 protocol may adjust the algorithm to produce the next sub-listing 208 so that it will require more steps; where one sub-listing 208 takes more time for a given set of computing devices to produce the sub-listing 208 protocol may adjust the algorithm to produce the next sub-listing 208 so that it will require fewer steps. As an example, protocol may require a new sub-listing 208 to contain a cryptographic hash describing its contents; the cryptographic hash may be required to satisfy a mathematical condition, achieved by having the sub-listing 208 contain a number, called a nonce, whose value is determined after the fact by the discovery of the hash that satisfies the mathematical condition. Continuing the example, the protocol may be able to adjust the mathematical condition so that the discovery of the hash describing a sub-listing 208 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 208 according to the protocol is known as "mining." The creation of a new sub-listing 208 may be designed by a "proof of stake" protocol as will be apparent to those skilled in the art upon reviewing the entirety of this disclosure.

Continuing to refer to FIG. 2, in some embodiments, protocol also creates an incentive to mine new sub-listings 208. The incentive may be financial; for instance, successfully mining a new sub-listing 208 may result in the person or entity that mines the sub-listing 208 receiving a predetermined amount of currency. The currency may be fiat currency. Currency may be crypto currency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 208 Each sub-listing 208 created in temporally sequential listing 204 may contain a record or at least a digitally signed assertion 200 describing one or more addresses that receive an incentive, such as virtual currency, as the result of successfully mining the sub-listing 208.

With continued reference to FIG. 2, where two entities simultaneously create new sub-listings 208, temporally sequential listing 204 may develop a fork; protocol may determine which of the two alternate branches in the fork is the valid new portion of the temporally sequential listing 204 by evaluating, after a certain amount of time has passed, which branch is longer. "Length" may be measured according to the number of sub-listings 208 in the branch. Length may be measured according to the total computational cost of producing the branch. Protocol may treat only at least a digitally signed assertion 200 contained the valid branch as valid at least a digitally signed assertion 200. When a branch is found invalid according to this protocol, at least a digitally signed assertion 200 registered in that branch may be recreated in a new sub-listing 208 in the valid branch; the protocol may reject "double spending" at least a digitally signed assertion 200 that transfer the same virtual currency that another at least a digitally signed assertion 200 in the valid branch has already transferred. As a result, in some embodiments the creation of fraudulent at least a digitally signed assertion 200 requires the creation of a longer temporally sequential listing 204 branch by the entity attempting the fraudulent at least a digitally signed assertion 200 than the branch being produced by the rest of the participants; as long as the entity creating the fraudulent at least a digitally signed assertion 200 is likely the only one with the incentive to create the branch containing the fraudulent at least a digitally signed assertion 200, the computational cost of the creation of that branch may be practically infeasible, guaranteeing the validity of all at least a digitally signed assertion 200 in the temporally sequential listing 204.

Still referring to FIG. 2, additional data linked to at least a digitally signed assertion 200 may be incorporated in sub-listings 208 in the temporally sequential listing 204; for instance, data may be incorporated in one or more fields recognized by block chain protocols that permit a person or computer forming a at least a digitally signed assertion 200 to insert additional data in the temporally sequential listing 204. In some embodiments, additional data is incorporated in an unspendable at least a digitally signed assertion 200 field. For instance, the data may be incorporated in an OP RETURN within the BITCOIN block chain. In other embodiments, additional data is incorporated in one signature of a multi-signature at least a digitally signed assertion 200. In an embodiment, a multi-signature at least a digitally signed assertion 200 is at least a digitally signed assertion 200 to two or more addresses. In some embodiments, the two or more addresses are hashed together to form a single address, which is signed in the digital signature of the at least a digitally signed assertion 200. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a digitally signed assertion 200 are typical crypto-currency addresses, such as addresses linked to public keys as described above, while one or more additional addresses in the multi-signature at least a digitally signed assertion 200 contain additional data related to the at least a digitally signed assertion 200; for instance, the additional data may indicate the purpose of the at least a digitally signed assertion 200, aside from an exchange of virtual currency, such as the item for which the virtual currency was exchanged. In some embodiments, additional information may include network statistics for a given node of network, such as a cryptographic evaluator, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the cryptographic evaluator) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 2, in some embodiments, virtual currency is traded as a crypto currency. In one embodiment, a crypto currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency.

Crypto currency may be centralized, with its protocols enforced or hosted by a particular entity. For instance, crypto currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 208 in a block chain computationally challenging; the incentive for producing sub-listings 208 may include the grant of new crypto currency to the miners. Quantities of crypto currency may be exchanged using at least a digitally signed assertion 200 as described above.

Still referring to FIG. 2, at least a digitally signed assertion 200 may be included data structures or memory elements besides a temporally sequential file, including without limitation any temporary or persistent memory as used in or by any computing device as described in this disclosure. For example, and without limitation, at least a digitally signed assertion 200 may include one or more encrypted or otherwise secured or partitioned memory entries as entered for instance using a secure computing module 108 or according to a secure computing protocol as described in further detail below.

In an embodiment, and still viewing FIG. 1, at least a temporal attester 104 may communicate with one or more sensing device 124s. At least a sensing device 124 may include any device suitable for use as at least a temporal attester 104 as described above. At least a sensing device 124 may include at least a sensor 128. At least a sensor 128, as used herein, is any device that detects a signal pattern from outside an electrical circuit containing at least a sensor 128 and converts that signal into an electrical signal. At least a sensor 128 may include, without limitation, an optical sensor 128, an acoustic sensor 128, a temperature sensor 128, a magnetic or Hall effect sensor 128, an accelerometer, a gyroscope, an inertial measurement unit (IMU), any device that converts electromagnetic signals into electrical signals, any device that converts signals conveyed through magnetic or capacitive coupling into electrical signals, pressure sensors 128 including without limitation piezoelectric sensors 128 and load cells, and the like. In an embodiment, sensor data detected using at least a sensor 128 may include temperature data, humidity data, $CO_2$, $O_2$, pH, radiation exposure levels, or any other environmental data; accelerometer, gyroscope, or any other inertial sensor data; GPS-based speed data, and any other data that may conceivably be instrumented by known methods. At least a sensing device 124 may include at least an antenna 132. At least a sensing device 124 may include any secure computing module 108 as described above.

With continued reference to FIG. 1, system 100 may include at least a temporal verifier 136. At least a temporal verifier 136 may include any device or devices suitable for use as at least a temporal attester 104 as described above. At least a temporal verifier 136 may include a processor, which may be any processor or combination of processors suitable for use as a processor included in at least a temporal attester 104 as described above. In an embodiment, processor may be configured to receive a temporally attested sensor 128 signal, wherein the temporally attested sensor 128 signal further includes at least a secure timestamp and at least a sensor 128 datum, verify the at least a secure timestamp and determine, as a function of the at least a secure timestamp, an authenticity of the a temporally attested sensor 128 signal, for instance as described in further detail below. Temporal verifier may include a plurality of temporal verifiers.

Continuing to refer to FIG. 4, at least a temporal verifier 136 may integrate a precision clock reference for determination of locations and latencies of nodes in a network graph. In non-limiting example, the precision clock reference may be a cesium- or rubidium-based atomic clock, active hydrogen maser, GPS disciplined oscillator, precision crystal oscillator, SAW oscillator, quartz oscillator or related that provides microsecond or better timing accuracy. In some embodiments, precision time may be used to establish physical distance by inference from latency statistics of nodes in the network, whether using probabilistic, Bayesian or other statistical methods, machine learning classifiers or other. In some embodiments, changes in inferred physical distance or latency between nodes in the graph may be used to flag potentially compromised secure computing modules 108, man in the middle or other attacks.

Still referring to FIG. 1, at least a temporal verifier 136 and/or one or more modules operating thereon may be designed and/or configured to perform any method, method step, or sequence of method steps in any embodiment described in this disclosure, in any order and with any degree of repetition. For instance, at least a temporal verifier 136 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. At least a temporal verifier 136 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 3:
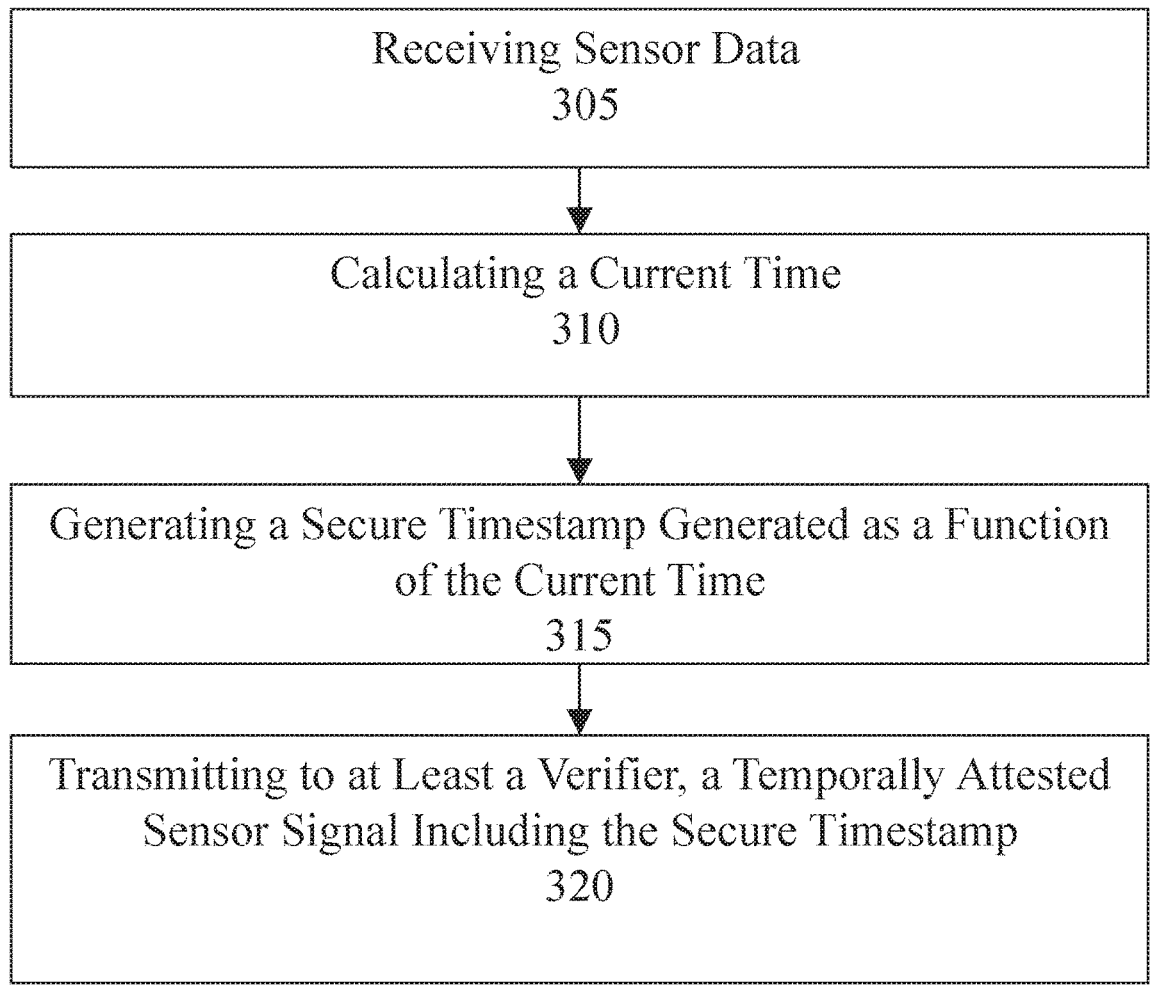
FIG. 3 illustrates particular implementations of various steps of a method of authenticating sensor data.

Referring now to FIG. 3, an exemplary embodiment of a method 300 of signal localization and verification of sensor data is illustrated. At step 305, at least a temporal attester 104 receives sensor data. Sensor data may include data received via an antenna 132 or via any other sensor 128 and/or sensing device 124 as described above. Sensor data may include data to be conveyed to any sensing device 124 as described above, including without limitation beacon data to be received at antenna 132. Sensor data may include a localization signal, which may be been detected by sensing device 124; alternatively, sensor data may be a localization signal to be transmitted to sensing device 124. A "localization signal," as used in this disclosure, is a signal indicating a location in geographical space, of a device originating the localization signal. Localization signal may include a unique radiofrequency beacon. For instance, localization signal may include a unique radiofrequency beacon as emitted by a satellite used in GPS or a similar navigational system. An object on the earth may use one or more radiofrequency beacons to determine partial or complete location in 3-dimensional space (3-space). Various correction factors, including time coding of the radiofrequency beacon and ground-based correction codes (e.g. those used in differential GPS) may be used to improve fidelity of location in 3-space. In an embodiment, geospatial data sources that may be utilized to establish location, include but are not limited to signal from: one or more geospatial positioning satellites (in non-limiting examples, the U.S. Global Positioning System (GPS) operated by the US Air Force, Russian GLONASS, the Chinese BeiDou, European Union Galileo, or the international Cospas-Sarsat program and any subsystems), one or more fixed point radio frequency location beacons, or any other signal source detectable by an observer with adequate instrumentation that may be used to infer location in 1, 2 or 3 spatial dimensions relative to the beacon(s).

Continuing to refer to FIG. 3, receiving sensor data may include generating the localization signal; for instance, where at least a temporal attester 104 includes or is a component of a satellite or other beacon generator for navigation processes, at least a temporal attester 104 may generate and/or timestamp the beacon prior to its transmission. Receiving the localization signal may include receiving the localization signal from a listener; for instance, listener may receiver localization signal as a beacon, including without limitation from a satellite, and may transmit it to at least a temporal attester 104. The method of claim 1, wherein the sensor data further comprises a sensing device 124 attestation. A sensing device 124 attestation may be any datum that identifies sensing device 124, according to any protocol whereby a secure computing module 108 may identify a device containing the secure computing module 108. This may include, without limitation, digitally signing the sensor data, or submitting the sensor data with a proof from a zero-knowledge proof protocol. Sensor data may be hashed, or conveyed as a hash; for instance, sensing device 124 may cryptographically hash the sensor data and convey it to at least a temporal attester 104.

At step 310, and still referring to FIG. 3, at least a temporal attester 104 calculates a current time. Calculating the current time may include calculating the current time using a local clock 116. Calculating the current time may include synchronizing local clock 116 to a reference clock, for instance as described above.

At step 315, with continued reference to FIG. 3, at least a temporal attester 104 generates a secure timestamp generated as a function of the current time; this may be implemented as described above in reference to FIGS. 1-2. Generating the secure timestamp may include digitally signing the secure timestamp using any digital signature protocol as described above. In one embodiment authenticity of received data signals is established by utilizing a chain of attestation via one or more attestation schemes (in nonlimiting example, via decentralized anonymous attestation (DAA)) to verify that the trusted computing module, into which the listener device is integrated, or to which the listener device is communicatively coupled, is an authentic trusted computing module that has the property of attested time. In an embodiment, DAA is an anonymous digital signature scheme, which instead of reliance on a certificate authority to link a particular private key to a particular party, uses reference to a group public key or to multiple public keys to verify an anonymous signature. Secure computing module 108 may act as a "first signer" of a digital signature, signing with a private key as described above. In an embodiment secure computing module 108 signs an element of data using the private key. A second signer, which may be secure computing module 108 and/or an additional element coupled thereto, may previously or subsequently sign the element of data or another element linked to the element previously signed; alternatively or additionally, second signer may use information or signature elements provided by secure computing module 108 to perform a digital signature. This process may, for instance, enable generation of novel secret keys using additional circuitry, to demonstrate, for instance, timeliness of execution and frustrate delay-based attacks. DAA may perform digital signature using a zero-knowledge proof; for instance, any non-interactive zero-knowledge proof and/or zero-knowledge proof that may be made non-interactive may be used to generate digital signature, where signature may be, for instance, the proof algorithm output, while verification program, trusted setups where needed, or the like may be publicly available for evaluation of digital signature, i.e. of the proof.

At step 320, and with continued reference to FIG. 3, at least a temporal attester 104 may transmit a temporally attested sensor signal including the secure timestamp to at least a verifier. Temporally attested sensor signal may link secure timestamp to sensor data; for instance, secure timestamp may be appended or otherwise included with temporally attested sensor signal. Alternatively or additionally, temporally attested sensor signal may be included in a data structure or referred to by a link or similar element that associates temporally attested sensor signal with secure timestamp. Transmitting may include transmitting to a listener, which may transmit in turn to a temporal verifier 136; in an embodiment, any of temporal verifier 136, temporal attester 104 and/or sensing device 124 may fulfil the role of any of the other devices, depending on which device has initiated methods 200 or 400 as described herein.

Still referring to FIG. 3, transmitting may further include entering a temporally attested sensor signal in a data structure accessible to the at least a verifier. Data structure may include any data structure whereby data may be shared, including any database, data store, or other protocol. For instance, and without limitation, secure timestamp and/or temporally attested sensor signal may be included in a temporally sequential listing as described above.

Referring now to FIG. 4, an exemplary embodiment of a method 400 of authenticating data signals is illustrated. At step 405, at least a temporal verifier 136 receives a temporally attested sensor signal. Temporally attested sensor signal may include at least a secure timestamp and at least a sensor datum. Temporally attested sensor signal may include at least a digital signature; at least a digital signature may include a digital signature signed by a sensing device 124. At least a digital signature may include a digital signature signed by a at least a temporal attester 104. Temporally attested sensor signal may include a hashed or linked timestamp. At least a secure timestamp may include a plurality of secure timestamps; for instance, at least a secure timestamp may have been subjected to temporal attestation, for example and without limitation temporal attestation as described above in reference to method 200, a plurality of different times by a plurality of different temporal assessors, with regard to the same time. A sensing device 124 may, for instance, have broadcast a signal to a community or network of temporal attester 104s 104 at the time in question, and each such temporal attester 104 may have, essentially simultaneously, performed the timestamp and transmitted it; temporally attested sensor signal may be assembled at sensing device 124 and/or at verifier.

With continued reference to FIG. 4, at step 410 at least a temporal verifier 136 verifies the at least a secure timestamp. Where the at least a secure timestamp includes at least a digital signature, verifying the at least a secure timestamp may include evaluating the at least a digital signature, for instance by performing a verification step of a zero-knowledge proof protocol, or by decrypting the signature using a public key corresponding to a private key used to encrypt the signature. Verification may further include verification of a hash; for instance, at least a temporal verifier 136 may receive a message purported to match the hash and may hash the message to check that the resulting digest matches a hashed value received as part of at least a secure timestamp. Where at least a secure timestamp includes at least an entry on a hash chain, verifying the at least a secure timestamp further comprises evaluation the at least an entry on the hash chain.

Still viewing FIG. 4, where at least a secure timestamp includes a plurality of secure timestamps verifying may include generating a plurality of verifications, each verification of the plurality of verifications representing a verification of a distinct secure timestamp of the plurality of secure timestamps, and verifying the at least a secure timestamp as a function of the plurality of verifications. This may be performed, for instance, using threshold cryptography as described above. In an embodiment, this may be combined with evaluation of multiple confidence levels in multiple temporal attester 104s 104; for instance, a contribution of each temporal attester 104 to calculation against a threshold may be weighted by a confidence level determined for such temporal attester 104 as described in further detail below. While highly infeasible, it is theoretically possible that a single device identifier in a single trusted computing module may be compromised by a malicious actor, and if such malicious actor also has sufficient knowledge of the beacon signals the compromised device should have received at a particular location in 3-space, such that a sophisticated actor may falsify the sensor data log to appear to be in a different location than is actually the case. To mitigate against single node compromises, in an embodiment, sensing device 124 and/or other device may, either alone or in conjunction with the self-attested timestamping method, send via DAA sensor data and local timestamp information to one or more verifier nodes in the network, that in turn may operate as trusted timestamp authority/authorities.

With continued reference to FIG. 4, where at least a temporal attester 104 generated the at least a secure timestamp, verifying the at least a secure timestamp may further include assigning at least a confidence level to the at least a temporal attester 104, and verifying the at least a secure timestamp as a function of the at least a confidence level. This may be performed by methods including reference to varying trust levels associated with various different implementations of secure computing modules 108 as described above. In an embodiment, assigning at least a confidence level includes determining an identity of at least a cryptographic evaluator, and assigning the confidence level as a function of the identity of the at least a cryptographic evaluator. Determination of identity of the at least a cryptographic evaluator may be performed using a trusted third-party (TTP) scheme. In an embodiment, a TTP scheme is a scheme in which a designated entity, such as a certificate authority as described above monitors and reviews a digital signature passed between two or more communicants. For instance, temporal verifier 136 and/or another device in communication with at least a temporal attester 104 may convey to at least a temporal attester 104 a "challenge" containing some element of data to which at least a temporal attester 104 may respond with a digital signature signing the challenge with a private key. A certificate authority may then attest to the possession of the private key by at least a temporal attester 104, thus identifying the at least a temporal attester 104 to the other device in communication. Certificate authority may include, without limitation, a manufacturer of a secure computing module 108 as described above; in an embodiment, verification of identity of at least a cryptographic evaluator by certificate authority may be combined with additional identification of cryptographic evaluator using secure computing module 108 as described in further detail below. A TTP process may be used to establish confidence level in at least a temporal attester 104 directly; for instance, a certificate authority may vouch for one or more attributes of at least a temporal attester 104, and such voucher may be used, solely or in combination with other processes, to determine the confidence level.

Still referring to FIG. 4, identifying at least a temporal attester 104 may alternatively or additionally involve identifying the at least a temporal attester 104 using a secure computing module 108 incorporated in the at least a temporal attester 104. For instance, secure computing module 108 may sign a challenge or other element of data using a digital signature that may only be signed by secure computing module 108; this may be accomplished by reference to a manufacturer's identification of a public key associated with the secure computing module 108 private key used in the signature. Secure computing module 108 may sign with a private key generated using a PUF as described above. In an embodiment, and as a non-limiting example, secure computing module 108 may implement a decentralized anonymous authentication scheme (DAA) as described above.

At step 415, and still viewing FIG. 4, at least a temporal verifier 136 determines, as a function of the at least a secure timestamp, an authenticity of the a temporally attested sensor signal. Determining may include comparing the at least a secure timestamp to a reference time, which may any currently calculated or recorded time. For instance, reference time may include a time recorded in a temporally sequential listing, hash chain, and/or other data structure. In an embodiment, reference time may include a current time, which may be calculated using any local or reference clock as described above. Comparison to a reference time may include a network latency calculation; for instance, at least a temporal verifier 136 may have recorded an estimate for how long a signal from a sensing device 124 or other element communicating temporally attested sensor signal should take to arrive at temporal verifier 136 after a time matching at least a secure timestamp. Where at least a temporal verifier 136 receives the temporally attested sensor signal more than a threshold amount of time beyond the calculated time, at least a temporal verifier 136 may reject as invalid the temporally attested sensor signal, for instance because a longer transmission time may indicate that a device conveying the temporally attested sensor signal to at least a temporal verifier 136 may be relaying the signal from a remote location, and therefore may not be located where it claims to be, or may not, for instance, be a sensing device 124 that recorded the sensor data.

Still viewing FIG. 4, in some embodiments, precision time may be used to establish physical distance by inference from latency statistics of nodes in the network, whether using probabilistic, Bayesian or other statistical methods, machine learning classifiers or other. In some embodiments, changes in inferred physical distance or latency between nodes in the graph may be used to flag potentially compromised secure computing modules 108, man in the middle or other attacks. In an embodiment, in at least a temporal verifier 136, the reference clock timestamp at time of receipt, along with the timestamp request from the listener node, and the verifier node's geospatial location information (obtained directly via e.g. GPS signals or any other signals mentioned above, and/or via network latency analysis) are stored in a data structure. Additionally, the method may append to the data structure the expected over-the-air latency, in the case of wireless transmission, or network latency, in the case of a wired network, and/or other pieces of network information that may be useful to establish location in the network graph. In all cases this information may be signed by the verifier node, such that the legitimacy of the listener node's attested geospatial location may be established relative to the verifier node(s) attested location(s). In this fashion, as more verifier nodes are incorporated into the ledger it becomes more infeasible to spoof the attested location of the listener node.

Continuing to refer to FIG. 4, location of a sensing device 124 or other device in system 100 and/or communicating with system 100, and/or veracity of a temporally attested timestamp, of localization data, or of any other datum to be evaluated may be evaluated. At least a temporal verifier 136 and/or at least a temporal attestor may receive at least a communication from another device in system 100, which may include sensing device 124, a temporal attestor, a temporal verifier 136, or any other suitable device, in any suitable form, including without limitation as textual data conveyed via electronic communication. At least a communication may include at least a packet set transmitted over a network; at least a packet set may be transferred over the network according to transfer control protocol/internet protocol (TCP/IP), hyper-text transfer protocol (HTTP), file transfer protocol (FTP), HTTP secure (HTTPS) or the like. At least a packet set may have data organized in one or more fields as described in further detail below; such data may be used for device fingerprinting or other device identification procedures as described in further detail below. At least a temporal verifier 136 and/or at least a temporal attestor may alternatively or additionally receive at least a communication by retrieving it from memory where it has been stored either entirely or in a representation such as a cryptographic hash as described above. Retrieval may include retrieval from any suitable data structure; for instance, and without limitation, retrieval may include receiving a transaction recorded in a temporally sequential listing.

At least a temporal verifier 136 and/or at least a temporal attestor may determine an identity of device sending communication as a function of at least a communication. Identifying may include, as a non-limiting example, comparing at least a datum received as an identifier from device sending communication to one or more stored values; one or more stored values may be stored in a temporally sequential listing as described above. One or more stored values may be stored in a database or other data structure. Identifying may include comparison of a digitally signed assertion and/or secure proof, as described in further detail below, in a temporally sequential listing or other data structure to a digitally signed assertion and/or secure proof received from device sending communication.

Still viewing FIG. 4, determining identity of device sending communication may include fingerprinting the first remote device; this may be performed as a function of at least a field parameter of the at least a communication. At least a field parameter may be any specific value set by device sending communication and/or user thereof for any field regulating exchange of data according to protocols for electronic communication. As a non-limiting example, at least a field may include a "settings" parameter such as SETTINGS_READER_TABLE_SIZE, SETTINGS_ENABLE_PUSH, SETTINGS_MAX_CONCURRENT_STREAMS, SETTINGS_INITIAL_WINDOW_SIZE, SETTINGS_MAX_FRAME_SIZE, SETTINGS_MAX_HEADER_LIST_SIZE, WINDOW_UPDATE, WINDOW_UPDATE, WINDOW_UPDATE, SETTINGS_INITIAL_WINDOW_SIZE, PRIORITY, and/or similar frames or fields in HTTP/2 or other versions of HTTP or other communication protocols. Additional fields that may be used may include browser settings such as "user-agent" header of browser, "accept-language" header, "session age" representing a number of seconds from time of creation of session to time of a current transaction or communication, "session_id," "transaction_id," and the like. Determining the identity of the device sending communication may include fingerprinting the device sending communication as a function of at least a machine operation parameter described in the at least a communication. At least a machine operation parameter, as used herein, may include a parameter describing one or more metrics or parameters of performance for a computing device and/or incorporated or attached components; at least a machine operation parameter may include, without limitation, clock speed, monitor refresh rate, hardware or software versions of, for instance, components of device sending communication, a browser running on device sending communication, or the like, or any other parameters of machine control or action available in at least a communication. In an embodiment, a plurality of such values may be assembled to identify device sending communication and distinguish it from other devices of one or more remote devices 108.

With continued reference to FIG. 4, identifying device sending communication may include evaluating a secure proof generated by the device sending communication and identifying the device sending communication as a function of the secure proof. A secure proof, as used herein, is a protocol whereby an output is generated that demonstrates possession of a secret, such as a secret stored in or produced by secure computing module 108 116 and/or PUF 124, without demonstrating the entirety of the secret; in other words, a secure proof by itself, is insufficient to reconstruct the entire secret, enabling the production of at least another secure proof using at least a secret. Where at least a secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a secret, for instance as used in a single challenge-response exchange.

With continued reference to FIG. 4, in an embodiment, determining identity of device sending communication may include determining a geographic location of device sending communication. This may be accomplished in various ways. For instance, and without limitation, determining the geographic location of device sending communication may include identifying an internet protocol address of device sending communication and determining the geographic location as a function of internet protocol address; this may be accomplished according to IP address geolocation. Alternatively or additionally, determination of geographic location may include determination of proximity to a verified device 128, where verified device 128 may have a known, recorded, or verified geographic location, and/or of proximity to At least a temporal verifier 136 and/or at least a temporal attestor.

Still referring to FIG. 4, proximity may be determined according one or more measures of distance or time between device sending communication and at least a temporal verifier 136 and/or at least a temporal attestor. For instance, and without limitation, where one device is connected to another via a network, proximity may be evaluated by measuring distances between the two devices in a graph representing the network; proximity may include, for instance a number of steps through the graph from the once device to another. Steps may also be weighted according to, e.g., estimates of physical distance or length of wire between devices connected by steps, as measured using network latency analysis and/or other processes for instance as described below. Proximity may include geographical location of any devices as described above may alternatively or additionally be determined using navigational facilities, such as the global positioning system (GPS) or other protocols used to determine the location of a device. Distance between devices may be computed using this information. Proximity may include temporal proximity; this may be computed using network latency analysis, time for response to a "ping" signal, or the like. Alternatively or additionally, past response times and/or past times involving communications in the past may be recorded in memory and/or in a temporally sequential listing. In an embodiment, geographic location of device sending communication may be determined as near to or within a certain radius of a device having a known geographic location.

Continuing to refer to FIG. 4, determining identity of device sending communication may include identifying the device sending communication as a function of user profile information belonging to a user operating the device sending communication. User profile information may include any information user provides about him or herself explicitly, as well as information recorded in past sessions, including without limitation transaction histories, search history, history of information sent or received by user, and the like. User profile information may identify user according personal identification information such as name or date of birth; alternatively one or more data of such personally identifying data may be omitted or stripped from user profile information to protect user privacy or anonymity.

Still referring to FIG. 4, at least a temporal verifier 136 and/or at least a temporal attestor device may calculate at least a heuristic of trust as a function of the at least a communication and the identity. At least a heuristic of trust may include one or more processes for determining a degree to which first remote device may be treated as trustworthy, based on partial or limited information; for instance, at least a heuristic of trust may be calculated or computed with regard to a device sending communication not identifiable using a secure computing module, by using geographic location, device fingerprint information, and/or other data as described in further detail herein, to identify determine trust in a device that is not as definitely identifiable as it would be using a secure computing module 108. At least heuristic of trust may output a confidence level as defined above as its output, and/or take at a confidence level as an input. Heuristics to infer trustworthiness of nodes and/or devices may be used in a positive or negative sense—that is, a positive heuristic connotes more trustworthiness, while a negative heuristic can be used to flag outliers that may be considered more likely to behave dishonestly.

With continued reference to FIG. 4, calculating the at least a heuristic of trust may include reconciling a first datum of at least a communication to at least a second datum of the at least a communication, and/or with at least a datum included in or with localization signal, sensor signal, and/or temporally attested sensor signal. For instance, user profile may contain information that may be compared to transaction history and/or device fingerprint; where such information is inconsistent in a manner suggesting some prevarication or degree of obfuscation, this may result in a lower confidence level than if such data is consistent. As a non-limiting example, calculating the at least a heuristic of trust further comprises reconciling a first geographic location determination with at least a second geographic determination; for instance, an IP address of device sending communication may be linked to a first geographic location according to IP geolocation, but proximity to a known device, such as any device described above as incorporated in or in communication with system 100, timing of transaction, user profile, or other information may suggest a different geographic location. In an embodiment, such a location-based inconsistency may be used to assign a lower confidence level as described below; alternatively, where connection via a TOR or proxy connection, for instance, is not necessarily treated as indicative of untrustworthiness, this may lead to exclusion of location-based identification and/or confidence-level determination for device sending communication. In an embodiment, a heuristic to infer trustworthiness of a node is established as a function of the position of a node within a network graph over time and properties related to location and network latency. In example, a node whose position suddenly changes may incur a reduction in trust level, if its location or timing latency changes in a manner inconsistent with historic trends, indicating e.g. potential compromise, man in the attack or other. Node location within the network graph in this context may be established by one or more means, including without limitation means for locating within a network or assessing proximity to one or more other devices, as measured via communication latency or timing analysis relative to other nodes in the network ("triangulation"), by geospatial information provided via e.g. GPS or other beacon-based location services, and the like.

Still referring to FIG. 4, calculation of at least a heuristic of trust may include determining a duration of past interaction and calculating the at least a heuristic as a function of the duration of past interaction; for instance, if device sending communication has a longer history of interactions with at least a temporal verifier 136 and/or at least a temporal attestor and/or a network or platform at issue, at least a temporal verifier 136 and/or at least a temporal attestor may assign a higher confidence level to device sending communication. Calculating the at least a heuristic of trust may include determining a most recent time of past interaction and calculating the at least a heuristic of trust as a function of the most recent time of past interaction; for instance, where device sending communication has interacted with at least a temporal verifier 136 and/or at least a temporal attestor and/or a network or platform in question more recently a higher confidence level may be associated with device sending communication. Calculating at least a heuristic of trust may include determining a degree of obscurity of the device sending communication; for instance, where device sending communication is sandboxed (preventing evaluation of machine-control parameters), or connecting through a proxy, TOR or other location/IP address-obscuring protocol or facility, the resulting inability to discover information concerning device sending communication may itself be used to assign a lower confidence level to at least a device sending communication.

Continuing to refer to FIG. 4, calculating at least a heuristic of trust may be performed by analysis of past interactions of device sending communication with system 100. For instance, and without limitation, calculating at least a heuristic of trust may include evaluating a degree of stake in at least a transaction to which the device sending communication is a party. For instance, and without limitation, where device sending communication is performing an exchange of value or financial transaction, where a current financial transaction involves a large amount of money, confidence level may be lowered. Calculation of at least a heuristic of trust may include identifying a plurality of transactions performed by first remote device and deriving an average transaction amount of the plurality of transactions; thus, for instance, where device sending communication has performed several transactions having a first average amount, and a current transaction involves a second amount less than or equal to first average amount, this may result in a higher confidence level being assigned to device sending communication than if second amount is much larger than first average amount. Calculating the at least a heuristic of trust may include determining a second confidence level in the identity of the first remote device, calculating the at least a heuristic as a function of the second confidence level; for instance, and without limitation, second confidence level may be a percentage of certainty concerning the determined identity, which may be used to weight first confidence level. In a further embodiment, a heuristic to infer trustworthiness of a node is established as a function of the regularity of transactional behavior; for instance, and without limitation, a heuristic of trust may assign a higher confidence level to device sending communication if device sending communication frequently interacts with system 100 and/or performs transactions or other interactions within system than if device sending communication interacts with system 100 infrequently. In an embodiment, a heuristic to infer trustworthiness of a node may be established by the total time the node has behaved honestly, the product of time and transaction value, any other similar combination of parameters of transaction history.

In an embodiment, and still referring to FIG. 4, system 100, at least a temporal verifier 136 and/or at least a temporal attestor and/or other elements of network may mandate that trust levels used in smart contracts or other interactions be adequately up to date; for instance, nodes operating smart contracts may be required maintain a threshold of freshness, as measured by recency of interaction with system 100 or elements thereof. The network may incentivize this freshness by penalizing transactions that are not up to date, for instance by requiring additional verifications of such a transaction or computation. This liveness parameter may incorporate a timeout or other means such that the contract itself is invalidated if the timeout expires before the completion of the smart contract.

Still viewing FIG. 4, calculation of heuristic may involve aggregation of heuristic outputs produced by evaluation of a plurality of heuristics. For instance, where output of each heuristic is a confidence level, evaluation device may calculate an aggregate confidence level. Establishment of an aggregate confidence level in device sending communication may involve, e.g., adding together confidence levels; alternatively, aggregate confidence level may be computed by viewing each confidence level as a probability and calculating an aggregate probability by averaging or other statistical combination processes. Alternatively or additionally, a machine-learning algorithm may analyze past transactions or interactions to determine an optimal mathematical operation for calculating an aggregate confidence level.

Continuing to refer to FIG. 4, in an embodiment, at least a temporal verifier 136 and/or at least a temporal attestor may delegate calculation of one or more heuristics of trust of at least a heuristic of trust to at least an additional device of one or more remote devices 108. At least a temporal verifier 136 and/or at least a temporal attestor may elect one or more devices to calculate the one or more heuristics of trust. Election process may make use any of proof by threshold of consensus, proof of authority, proof of stake, proof of elapsed time, or any other distributed validation method apparent to those skilled in the art. In an embodiment, information used to establish heuristics of trust may be obtained by incentivizing collection or aggregation of data by one or more remote devices, at least a temporal verifier 136, and/or at least a temporal attestor using one or more economic schemes. In a nonlimiting example, at least a temporal verifier 136 and/or at least a temporal attestor and/or remote device may collect information that is considered "fresh", e.g., has an authenticated time stamp that reflects it has been obtained within a period of time defined by the network protocol, and considered authentic. In the case of collection by a trusted hardware node, such as a verified device as described elsewhere in this disclosure, authenticity may be defined as having incorporated a valid signature of authenticity. In the case of untrusted hardware, such as a remote device of that does not include a secure computing module 108, or that possesses a secure computing module 108 associated with a confidence level and/or confidence level in identity falling below a threshold required for treatment as a verified device, authenticity may be defined as having been validated using any heuristic of trust, including without limitation some proof by threshold of consensus, by proof of authority, by proof of stake, by proof of elapsed time, or any other distributed validation method that may be apparent to those skilled in the art, upon reviewing the entirety of this disclosure.

In the case of a permissioned or private network, in a representative embodiment, information used to establish heuristics of trust may be obtained by one or more remote devices dedicated to performing such a task, including without limitation one or more verified devices. This selection of dedicated devices may be performed to safeguard privacy or data integrity, or to reserve computationally expensive calculation of heuristics of trust to devices having security and/or computational abilities to achieve such goals. For instance, in an embodiment, in order to preserve privacy and confidentiality of behavior of nodes that may otherwise be obtained via mining of metadata, computing heuristics to infer trust may be restricted to only occur within specialized nodes in the network for instance, local heuristic data may be encrypted by miner nodes or others, with only a subset of trusted nodes having the decryption key. Data for heuristic calculation may be broadcast with prioritized routing, header flags or the like to minimize network congestion.

Still viewing FIG. 4, one or more machine learning algorithms may be performed by devices calculating heuristics of trust. In a representative embodiment, system 100 incorporates heuristic engines, or trust heuristics that are operated by machine learning algorithms, deep learning algorithms, convolutional neural networks, feed forward neural networks and the like maintained as smart contracts. In an embodiment, a heuristic engine is a machine learning algorithm operated as a smart contract within a trusted computing boundary. Devices performing such machine learning and/or artificial intelligence algorithms may be selected as dedicated devices and/or verified devices as described above. Alternatively or additionally, such devices may include devices that perform heuristic calculations according to one or more incentive schemes. For instance, computationally intensive training of these algorithms may be incentivized via economic schemes, e.g. economic remuneration in exchange for operating correct training computations. Representative examples may utilize one or more nodes with a trusted execution enclave, inherently secure processor or other attestable computing architecture, or utilize zero knowledge proofs (e.g. ZK-STARKs, ZK-SNARKs) to provably perform training computations. In a representative embodiment, the parameters resulting from optimization of the heuristic engine via training computations may be propagated to other nodes within the network in order to iteratively improve both the accuracy and efficiency of the heuristics utilized. In a non-limiting example, a trained model may suggest that trust heuristics are most accurate utilizing a given parameter sampled at a particular temporal resolution, e.g. once every N transactions or every M units of time. The network may then incentivize collection of such parameters directly from the nodes on the network by penalizing those that do not provide such parameters. Parameters may be shared as a selective broadcast with time stamp to prove liveness (e.g. an incremented counter, attested time, etc). This broadcast may be encrypted by any number of means such that only a subset of nodes in the network can decrypt the broadcast, e.g. in order to preserve privacy and confidentiality of behavior of nodes that may otherwise be obtained via mining of metadata. In such a scenario, the subset of nodes performing decryption may be elected as described above, may have requirements of minimum hardware security, and may utilize threshold cryptography. To maximize efficiency, this decryption of heuristic information may be performed in federated, sharded or otherwise subdivided networks. Alternatively or additionally, heuristics of trust are sampled probabilistically, e.g. via random beacons as described in the Ethereum protocol, via randomization via proof of elapsed time, or any other means to establish random election or sampling.

In an embodiment, and with continued reference to FIG. 4, calculating at least a heuristic of trust may include receiving, from a verified device, a datum identifying the first device, and calculating the at least a heuristic of trust as a function of the datum identifying the first device. Datum identifying device sending communication may include a digitally signed assertion generated by the verified remote device digitally signed assertion may be created using any protocol for creation of a digitally signed assertion, including a digital signature signed with a private key possessed and/or generated by verified remote device 128, a secure proof, as defined above, generated according to any protocol or combination of protocols as described above by verified remote device 128, or the like. Identification of at least a second cryptographic evaluator and/or other device may include verification information that may be combined with a secure proof issued by second cryptographic evaluator to verify or authenticate second cryptographic evaluator, including without limitation an address as described above, a public key as described above, a verification associated with a zero-knowledge proof, or the like. This may be combined with other metrics or evaluation of other information regarding interactions between device sending communication and verified remote device including trusted time evaluation to assess communication time between verified remote device and device sending communication, according to trusted time procedures as described in further detail below.

In an embodiment, a heuristic to infer trustworthiness of a node may be established as a function of a given node's association with other nodes considered highly trusted by either intrinsic properties (e.g., trust established by inherently secure processor architecture, attested chain of trust, trusted enclave, or similar), or by inferred properties (e.g., iterative heuristics). In an example, a node with little history on a network participates in transactions with one or more other nodes that have established trust levels by construction (intrinsic trust properties), and/or with a longer history of honest execution (inferred trust properties). In this case, some beneficial weight is assigned to the new, relatively unknown node by way of the association with the node(s) with a longer history of honest execution. Thus, as a non-limiting example, calculation of at least a heuristic of trust may include determining a confidence level of at least a second device, for instance of one or more remote devices 108, associated with device sending communication through transactions and calculating the at least a heuristic of trust as a function of the confidence level of the at least a second device. Such association may be evaluated or weighted according to number or duration of transactions in which device sending communication and second device were involved, transaction amounts of such transactions, a number of verifications performed between first remote device and second device, or any combination of the above.

Continuing to refer to FIG. 4, in an embodiment, it may be desirable to maintain anonymity or pseudonymity of at least a sensing device 124's location information in the process of authenticating the attested location, e.g. in the case where the listener node represents a sensitive shipment, but it is desirable for the recipient of the shipment to receive in real time or approximately real time the location, sensor data or other information from the listener node. In a variant of the above method to verify geospatial information, listener and observer nodes may utilize one or more cryptographic methods to establish secure communications; in nonlimiting examples, these may include public/private key encryption, symmetric encryption, interacting or non-interacting zero knowledge proofs e.g. zero knowledge succinct non-interactive arguments of knowledge (zk-SNARKs), or any others known to those skilled in the art. At least a sensing device 124 may establish a secure connection to, e.g., at least a temporal attester 104 or other device; secure connection may be established, as a non-limiting example, using a handshake protocol, a secure sockets protocol, such as a secure sockets layer (SSL) protocol, or by any other means or method for creating a secure connection that may occur to persons skilled in the art upon reviewing the entirety of this disclosure.

Continuing to view FIG. 4, upon establishing a secure channel, at least a sensing device 124 may transmit or broadcast within the secure channel sensor data that may include attestation of one or more pieces of information, including attested timestamp, attested identity, or any other attested datum, which may be attested to using any means or method described herein and/or that may occur to a person skilled in the art upon reviewing the entirety of this disclosure. Transmittal may be sent via other nodes in a network including at least a sensing device 124, including at least a temporal attester 104, temporal verifier 136, at least a sensing device 124, and/or any other devices in communication with any other element or node connected to network, with a flag indicating to neighboring or other nodes that they should append their geospatial location data, if able to share, timestamp or arrival, and may include network graph information (e.g. network latency characteristics) and repeat the encrypted communication. The observer node(s), upon receiving the repeated encrypted communication along with appended information, may decrypt the communication and compute the likelihood that the sensor data is authentic. In an embodiment, one or more verifier nodes, including without limitation temporal verifier 136, may compute locally, or via a communicatively connected device, the likelihood that the sensor data is authentic; computation may include evaluating one or more elements of geospatial or temporal data, including without limitation timestamps, attested timestamps, or the like. Computation may include evaluation of one or more digital signatures, zero-knowledge proofs, or the like. Computation may include comparison of geospatial data to geospatial data describing, for instance, a location of or near to verified node, a location near to or of at least a sensing device 124, and/or a location of or near to one or more intermediate nodes. Computation may include comparison of temporal data to temporal data describing or within a threshold period of time before, a time at which verified node receives communication. Verified node may, for instance, determine a location or general location, and/or range of time within which forwarding nodes likely processed or forwarded communication, and compare such determined location and/or time range to a location or timed attested to or asserted by at least a sensing device 124; e.g., if at least a sensing device 124 asserts a recent time, but intervening nodes append attested timestamps preceding that time, verified node may conclude that asserted time is fraudulent; similarly, if forwarding nodes cluster geographically in one area and at least a sensing device 124 asserts a location in a distinct area, verified node may conclude provided location information was fraudulent. In an embodiment, the above process may permit listener node/at least a sensing device 124 to prove to a subset of nodes, or prove using input from a subset of nodes, authenticity of time, location, or both at which at least a sensing device 124 detected and/or reported sensor data.

Still referring to FIG. 4 determining authenticity may include identifying at least a sensing device 124 that produced the at least a sensor datum. This may be performed according to any process usable to identify at least a temporal attester 104 as described above, including without limitation using one or more heuristics of trust. Determining authenticity may further include determining at least a confidence level in the at least a sensing device 124; this determination of a confidence level may be performed as described above.

With continued reference to FIG. 4, determining the authenticity further comprises comparing the at least a sensor datum to at least a reference datum. This may be performed, for instance, by comparing the at least a sensor datum to data recorded by nearby sensors; where, for instance, sensing device 124 reports a temperature of –10 degrees Celsius, but other sensors determined to be near to sensing device 124, using location services such as GPS, beacons, and/or network latency analysis, are recording a temperature of 25 degrees Celsius, temporal verifier 136 may determine that sensor data is inauthentic. In an example, establishing likelihood that the geospatial sensor data is legitimate includes determining from in non-limiting example the over the network latency between sensing device 124 attested geospatial location and temporal verifier 136's geospatial location, the physical distance between the at least a first verifier node and the listener node. In similar fashion other temporal verifiers 136 may be used to further verify the authenticity of the attested geospatial location. In an embodiment, the sensor data verified by the trusted computing module method above may be temperature data, humidity data, $CO_2$, $O_2$, pH, radiation exposure levels, or any other environmental data; accelerometer, gyroscope, or any other inertial sensor data; GPS-based speed data, and any other data that may conceivably be instrumented by known methods.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
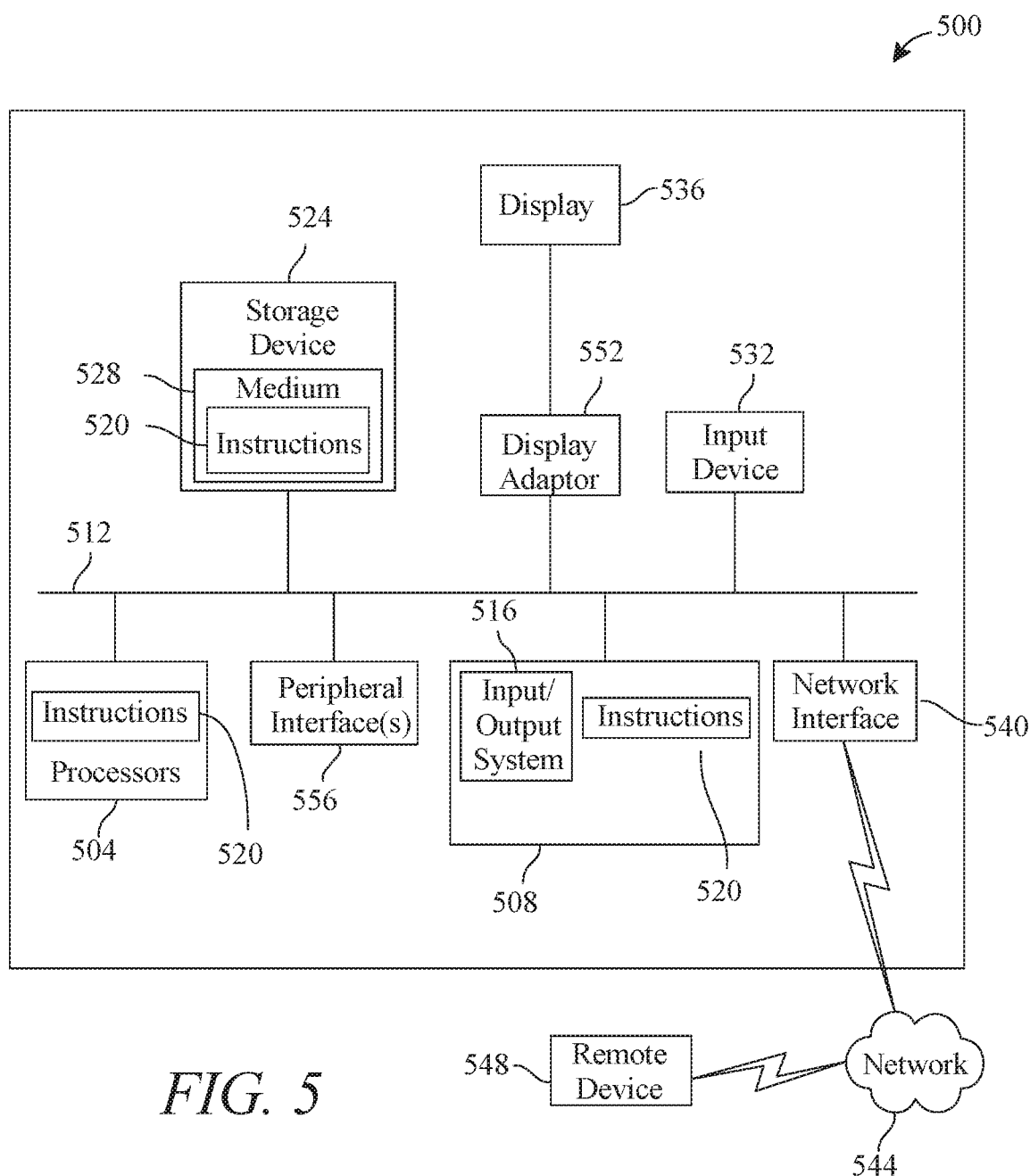
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for signal localization and verification of sensor data, the system comprising:
a temporal attestor, the temporal attestor comprising:
 a processor configured to:
  receive sensor data;
  calculate a current time;
  generate a secure timestamp generated as a function of the current time; and
  transmit a temporally attested sensor signal including the secure timestamp and the sensor data; and
a temporal verifier, the temporal verifier comprising:
 a processor configured to:
  receive, from the temporal attestor, the temporally attested sensor signal including the secure time stamp;
  verify the secure time stamp; and
  determine, as a function of the secure time stamp, an authenticity of the temporally attested sensor signal, wherein the determining the authenticity of the temporally attested sensor signal comprises:
   comparing the secure time stamp to a reference time, the comparing the secure time stamp to the reference time comprising:
    calculating, by the temporal verifier, a network latency;
    calculating, by the temporal verifier, an expected transmission time of the temporally attested sensor signal based on the network latency;
    comparing the expected transmission time and a threshold amount of time beyond the expected transmission time; and
    determining the authenticity of the temporally attested sensor signal based on the comparison of the expected transmission time and the threshold amount of time beyond the expected transmission time.

2. The system of claim 1, wherein the sensor data further includes a localization signal.

3. The system of claim 2, wherein the localization signal further comprises a unique radiofrequency beacon.

4. The system of claim 2, wherein receiving the localization signal further comprises generating the localization signal.

5. The system of claim 2, wherein receiving the localization signal further comprises receiving the localization signal from a listener.

6. The system of claim 1, wherein the sensor data further comprises a sensing device attestation.

7. The system of claim 1, wherein calculating the current time further comprises calculating the current time using a local clock.

8. The system of claim 7, wherein calculating further comprises synchronizing the local clock to a reference clock.

9. The system of claim 1, wherein generating the secure timestamp further comprises digitally signing the secure timestamp.

10. The system of claim 1, wherein generating the secure timestamp further comprises recording the current time in a hash chain.

11. A method of signal localization and verification of sensor data the method comprising:
receiving, by at least a temporal attester, sensor data;
calculating, by the at least a temporal attester, a current time;
generating, by the at least a temporal attester, a secure timestamp generated as a function of the current time;
transmitting, by the at least a temporal attester and to at least a temporal verifier, a temporally attested sensor signal including the secure timestamp;
receiving, by the temporal verifier from the temporal attestor, the temporally attested sensor signal including the secure time stamp;
verifying, by the temporal verifier, the secure time stamp; and
determining, by the temporal verifier as a function of the secure time stamp, an authenticity of the temporally attested sensor signal, wherein the determining the authenticity of the temporally attested sensor signal comprises comparing the secure time stamp to a reference time, the comparing the secure time stamp to the reference time comprising:
 calculating, by the temporal verifier, a network latency;
 calculating, by the temporal verifier, an expected transmission time of the temporally attested sensor signal based on the network latency;
 comparing, by the temporal verifier, the expected transmission time and a threshold amount of time beyond the expected transmission time; and
 determining, by the temporal verifier, the authenticity of the temporally attested sensor signal based on the comparison of the expected transmission time and the threshold amount of time beyond the expected transmission time.

12. The method of claim 11, wherein the sensor data further includes a localization signal.

13. The method of claim 12, wherein the localization signal further comprises a unique radiofrequency beacon.

14. The method of claim 12, wherein receiving the localization signal further comprises generating the localization signal.

15. The method of claim 12, wherein receiving the localization signal further comprises receiving the localization signal from a listener.

16. The method of claim 11, wherein the sensor data further comprises a sensing device attestation.

17. The method of claim 11, wherein generating the secure timestamp further comprises digitally signing the secure timestamp.

18. The method of claim 11, wherein generating the secure timestamp further comprises recording the current time in a hash chain.

19. The method of claim 11, wherein transmitting the temporally attested sensor signal further comprises transmitting to a listener.

20. The method of claim 11, wherein transmitting the temporally attested sensor signal further comprises entering the temporally attested sensor signal in a data structure accessible to the at least a verifier.

* * * * *